US010218969B2

United States Patent
Sato

(10) Patent No.: US 10,218,969 B2
(45) Date of Patent: Feb. 26, 2019

(54) IMAGE PROCESSING DEVICE AND METHOD USING ADJUSTED MOTION VECTOR ACCURACY BETWEEN SUB-PIXELS OF REFERENCE FRAMES

(75) Inventor: Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 262 days.

(21) Appl. No.: 14/113,882

(22) PCT Filed: May 9, 2012

(86) PCT No.: PCT/JP2012/061861
§ 371 (c)(1),
(2), (4) Date: Oct. 25, 2013

(87) PCT Pub. No.: WO2012/157488
PCT Pub. Date: Nov. 22, 2012

(65) Prior Publication Data
US 2014/0044170 A1 Feb. 13, 2014

(30) Foreign Application Priority Data
May 17, 2011 (JP) .................................. 2011-110669

(51) Int. Cl.
*H04N 19/105* (2014.01)
*H04N 19/523* (2014.01)
(Continued)

(52) U.S. Cl.
CPC ......... *H04N 19/105* (2014.11); *H04N 19/176* (2014.11); *H04N 19/196* (2014.11);
(Continued)

(58) Field of Classification Search
CPC ........... H04N 19/00733; H04N 19/105; H04N 19/176; H04N 19/46; H04N 19/196;
(Continued)

(56) References Cited

U.S. PATENT DOCUMENTS 6,687,303 B1* 2/2004 Ishihara ................. H04N 5/145
348/E5.066
2001/0028682 A1* 10/2001 Nakaya .................. H04N 19/52
375/240.16
(Continued)

FOREIGN PATENT DOCUMENTS

WO WO2007/092215 A2 8/2007
WO WO2009/126921 A1 10/2009
(Continued)

OTHER PUBLICATIONS

Feb. 17, 2015, JP communication issued for related JP application No. 2011-110669.
(Continued)

*Primary Examiner* — Mohammed Jebari
(74) *Attorney, Agent, or Firm* — Paratus Law Group, PLLC

(57) ABSTRACT

The present technology relates to an image processing device and a method capable of improving encoding efficiency. In a weighted prediction process performed in an image encoding process or in an image decoding process, a motion compensation unit that performs motion compensation of sub-pixel accuracy for each of L0 and L1, a weighted addition unit that applies weighted addition to arithmetic operation results by the motion compensation unit, and a rounding processing unit that suppresses a decrease in arithmetic operation accuracy by performing a necessary rounding process once with respect to an arithmetic operation result by the weighted addition unit are provided. The present disclosure can be applied to an image processing device.

12 Claims, 25 Drawing Sheets

(51) Int. Cl.
*H04N 19/176* (2014.01)
*H04N 19/46* (2014.01)
*H04N 19/196* (2014.01)
*H04N 19/61* (2014.01)
*H04N 19/119* (2014.01)

(52) U.S. Cl.
CPC .......... *H04N 19/46* (2014.11); *H04N 19/523* (2014.11); *H04N 19/61* (2014.11); *H04N 19/119* (2014.11)

(58) Field of Classification Search
CPC .... H04N 19/61; H04N 19/523; H04N 19/119; H04N 7/50; H04N 7/26244; H04N 7/26271; H04N 7/26015; H04N 7/26031
See application file for complete search history.

(56) References Cited

U.S. PATENT DOCUMENTS

| | | | | |
|---|---|---|---|---|
| 2003/0112864 A1* | 6/2003 | Karczewicz | .......... | G06T 3/4007 375/240.01 |
| 2006/0120453 A1* | 6/2006 | Ikeda | .................. | H04N 19/105 375/240.16 |
| 2006/0245495 A1* | 11/2006 | Han | ...................... | H04N 19/34 375/240.13 |
| 2009/0010330 A1* | 1/2009 | Tourapis | .............. | H04N 19/105 375/240.12 |
| 2010/0074332 A1* | 3/2010 | Karczewicz | ............. | H04N 7/50 375/240.12 |
| 2010/0086027 A1* | 4/2010 | Panchal | .......... | H04N 19/00024 375/240.12 |
| 2010/0177827 A1* | 7/2010 | Sroka | ..................... | H04N 19/43 375/240.17 |
| 2011/0007802 A1* | 1/2011 | Karczewicz | ......... | H04N 19/105 375/240.15 |
| 2011/0007803 A1* | 1/2011 | Karczewicz | ......... | H04N 19/105 375/240.15 |
| 2011/0170604 A1* | 7/2011 | Sato | ..................... | H04N 19/176 375/240.16 |
| 2011/0211635 A1* | 9/2011 | Amano | .............. | H04N 19/0063 375/240.02 |
| 2012/0069905 A1* | 3/2012 | Kato | ....................... | H04N 19/70 375/240.16 |
| 2013/0022123 A1* | 1/2013 | Ueda | ...................... | H04N 19/51 375/240.16 |
| 2013/0128974 A1* | 5/2013 | Chien | .............. | H04N 19/00903 375/240.15 |
| 2013/0229485 A1* | 9/2013 | Rusanovskyy | .... | H04N 13/0048 348/43 |
| 2014/0010310 A1* | 1/2014 | Rapaka | .................. | H04N 19/52 375/240.17 |

FOREIGN PATENT DOCUMENTS

WO WO2010/035731 A1 4/2010
WO WO2011/006004 A1 1/2011

OTHER PUBLICATIONS

Cammas N. Amonou, et al., Description of video coding technology proposal by France Telecom, NTT, NTT DOCOMO, Panasonic and Technicolor, Joint Collaborative Team on Video Coding (JCT-VC) of ITU-T SG16 WP3 and ISO/IEC JTC1/SC29/WG11, Apr. 15-23, 2010, pp. 1-7, 1$^{st}$ Meeting: Dresden, DE.

Jill M. Boyce, Weighted Prediction in the H.264/MPEG AVC Video Coding Standard, Thomson—Corporate Research Princeton, 2004, pp. 789-792.

Jul. 5, 2016, CN communication issued for related CN application No. 201280022512.7.

\* cited by examiner

FIG. 2

| A | $e_1$ | b |   | A |
|---|---|---|---|---|
|   | $e_2$ | $e_3$ |   |   |
| d |   | c |   | d |
|   |   |   |   |   |
| A |   | b |   | A |

FIG. 12

| L0/L1 | (1/1,1/1) | (1/1,1/2) | (1/1,1/4) | (1/2,1/1) | (1/2,1/2) | (1/2,1/4) | (1/4,1/1) | (1/4,1/2) | (1/4,1/4) |
|---|---|---|---|---|---|---|---|---|---|
| (1/1,1/1) | 0 | $2^H$ | $2^Q$ | $2^H$ | $2^{2H}$ | $2^{H+Q}$ | $2^Q$ | $2^{H+Q}$ | $2^{2Q}$ |
| (1/1,1/2) | $2^H$ | 0 | $2^{Q-H}$ | 0 | $2^H$ | $2^Q$ | $2^{Q-H}$ | $2^Q$ | $2^{2Q-H}$ |
| (1/1,1/4) | $2^Q$ | $2^{Q-H}$ | 0 | $2^{Q-H}$ | $2^{2Q-H}$ | $2^H$ | 0 | $2^{Q-H}$ | $2^Q$ |
| (1/2,1/1) | $2^H$ | 0 | $2^{Q-H}$ | 0 | $2^H$ | $2^Q$ | $2^{Q-H}$ | $2^Q$ | $2^{2Q-H}$ |
| (1/2,1/2) | $2^{2H}$ | $2^H$ | $2^{2Q-H}$ | $2^H$ | 0 | $2^{Q-H}$ | $2^{[2H-Q]}$ | $2^{Q-H}$ | $2^{2Q-2H}$ |
| (1/2,1/4) | $2^{H+Q}$ | $2^Q$ | $2^H$ | $2^Q$ | $2^{Q-H}$ | 0 | $2^H$ | 0 | $2^{Q-H}$ |
| (1/4,1/1) | $2^Q$ | $2^{Q-H}$ | 0 | $2^{Q-H}$ | $2^{[2H-Q]}$ | $2^H$ | 0 | $2^H$ | $2^Q$ |
| (1/4,1/2) | $2^{H+Q}$ | $2^Q$ | $2^{Q-H}$ | $2^Q$ | $2^{Q-H}$ | 0 | $2^H$ | 0 | $2^{Q-H}$ |
| (1/4,1/4) | $2^{2Q}$ | $2^{2Q-H}$ | $2^Q$ | $2^{2Q-H}$ | $2^{2Q-2H}$ | $2^{Q-H}$ | $2^Q$ | $2^{Q-H}$ | 0 |

IMAGE PROCESSING DEVICE AND METHOD USING ADJUSTED MOTION VECTOR ACCURACY BETWEEN SUB-PIXELS OF REFERENCE FRAMES

CROSS REFERENCE TO PRIOR APPLICATION

This application is a National Stage Patent Application of PCT International Patent Application No. PCT/JP2012/061861 (filed on May 9, 2012) under 35 U.S.C. § 371, which claims priority to Japanese Patent Application No. 2011-110669 (filed on May 17, 2011), which are all hereby incorporated by reference in their entirety.

TECHNICAL FIELD

The present invention relates to an image processing device and a method, and especially, relates to an image processing device and a method capable of improving encoding efficiency.

BACKGROUND ART

In recent years, devices compliant to formats such as MPEG (Moving Picture Experts Group) or the like have come into widespread use in information distribution such as broadcasting and information reception in general households. The devices handle image information as digital signals, take advantage of redundancy peculiar to the image information in order to perform highly effective information transmission and accumulation at that time, and compresses the image by orthogonal transform such as discrete cosine transform or the like and motion compensation.

In particular, MPEG2 (ISO (International Organization for Standardization)/IEC (International Electrotechnical Commission) 13818-2) is defined as a general-purpose image encoding format, and is a standard encompassing both of interlaced scanning images and sequential-scanning images, and standard resolution images and high definition images. For example, MPEG2 has been widely employed now in broad range of applications for professional usage and for consumer usage. By employing the MPEG2 compression format, a code amount (bit rate) of 4 to 8 Mbps is allocated to a standard resolution interlaced scanning image having 720×480 pixels, and 18 to 22 Mbps is allocated to a high resolution interlaced scanning image having 1920×1088 pixels, for example, whereby a high compression rate and excellent image quality can be realized.

MPEG2 is mainly intended for high image quality encoding adapted to broadcasting usage, and a lower code amount (bit rate) than the code amount of MPEG1, i.e., an encoding format having a higher compression rate is not handled. With the widespread of mobile terminals, needs for such an encoding format will be increased from now on, and in response to such needs, standardization of the MPEG4 encoding format has been performed. With regard to an image encoding format, the specification was confirmed as international standard as SOC/IEC 14496-2 in December in 1998.

Further, in recent years, standardization of a standard called H.26L (ITU-T (International Telecommunication Union Telecommunication Standardization Sector) Q6/16 VCEG (Video Coding Experts Group)) has progressed, originally intended for image encoding for videoconferencing usage. Compared with the conventional encoding techniques such as MPEG2 and MPEG4, H.26L requires a larger amount of calculation in encoding and decoding, but is known to achieve higher encoding efficiency. Also, currently, as a part of the activity of MPEG4, standardization for taking advantage of functions not supported by H.26L to realize higher encoding efficiency has been performed based on the H.26L as Joint Model of Enhanced-Compression Video Coding.

As a schedule of standardization, H.264 and MPEG-4 Part10 (AVC (Advanced Video Coding)) become an international standard in March, 2003.

Further, as an extension thereof, FRExt (Fidelity Range Extension) including a coding tool necessary for business use such as RGB, 4:2:2, or 4:4:4, 8×8 DCT (Discrete Cosine Transform) and quantization matrix stipulated by MPEG-2 has been standardized in February, 2005, whereby AVC can be used as an encoding format capable of suitably expressing even film noise included in movies, and has come to be employed for wide ranging applications such as Blu-Ray Disc (registered trademark) and the like.

However, nowadays, needs for higher-compression encoding have been increased, intending to compress an image having around 4000×2000 pixels, which is quadruple of a high-vision image, or to distribute a high-vision image within an environment with a limited transmission capacity like the Internet. Therefore, in VCEG (Video Coding Expert Group) under the control of ITU-T, studies related to improvement of encoding efficiency have been continuously performed.

By the way, the macroblock size of 16×16 pixels is not the best for large image frames such as UHD (Ultra High Definition: 4000×2000 pixels) that will be handled in next-generation encoding methods.

Currently, with a view to further enhancing the encoding efficiency compared than AVC, standardization of an encoding format called HEVC (High Efficiency Video Coding) has been in progress by JCTVC (Joint Collaboration Team—Video Coding) that is a joint standardization body of ITU-T and ISO/IEC (for example, see Non-Patent Document 1).

IN the HEVC encoding format, a coding unit (CU) is defined as a processing unit similarly to the macroblock in AVC. The CU is not fixed to 16×16 pixels like the macroblock in AVC, and is designated in each sequence in the image compression information.

By the way, in MPEG2 and MPEG4, for example, in a sequence like a fade scene, where a motion exists and brightness is changed, an encoding tool for absorbing the change of the brightness is not prepared. Thus, there is a problem of decreasing the encoding efficiency.

To solve the problem, a weighted prediction process is provided in AVC (for example, see Non-Patent Document 2). In AVC, whether the weighted prediction is used can be designated in units of slices.

Further, in AVC, the weighted prediction can be applied in units of slices. Furthermore, a method of applying the weighted prediction in units of blocks (intensity compensation) is also disclosed (for example, see Non-Patent Document 3).

CITATION LIST

Non-Patent Document

Non-Patent Document 1: Thomas Wiegand, Woo-Jin Han, Benjamin Bross, Jens-Rainer Ohm, Gary J. Sullivan, "Working Draft 1 of High-Efficiency Video Coding", JCTVC-C403, Joint Collaborative Team on Video Coding (JCT-VC) of ITU-T SG16 WP3 and ISO/IEC JTC1/SC29/WG113rd Meeting: Guangzhou, CN, 7-15 Oct. 2010

Non-Patent Document 2: Yoshihiro Kikuchi, Takeshi Chujoh, "Improved multiple frame motion compensation using frame interpolation", JVT-B075, Joint Video Team (JVT) of ISO/IEC MPEG & ITU-T VCEG(ISO/IEC JTC1/SC29/WG11 and ITU-T SG16 Q.6) 2nd Meeting: Geneva, CH, Jan. 29-Feb. 1, 2002

Non-Patent Document 3: I. Amonou, N. Cammas, G. Clare, J. Jung, L. Noblet, S. Pateux, S. Matsuo, S. Takamura, C. S. Boon, F. Bossen, A. Fujibayashi, S. Kanumuri, Y. Suzuki, J. Takiue, T. K. Tan, V. Drugeon, C. S. Lim, M. Narroschke, T. Nishi, H. Sasai, Y. Shibahara, K. Uchibayashi, T. Wedi, S. Wittmann, P. Bordes, C. Gomila, P. Guillotel, L. Guo, E. Francois, X. Lu, J. Sole, J. Vieron, Q. Xu, P. Yin, Y. Zheng, "Description of video coding technology proposal by France Telecom, NTT, NTT DOCOMO, Panasonic and Technicolor", JCTVC-A114, Joint Collaborative Team on Video Coding (JCT-VC) of ITU-T SG16 WP3 and ISO/IEC JTC1/SC29/WG111st Meeting: Dresden, DE, 15-23 Apr. 2010

SUMMARY OF THE INVENTION

Problems to be Solved by the Invention

However, in the above-described weighting process, a rounding process is performed for motion compensation, and the rounding process is further performed after weighted addition. Therefore, there is a concern that the encoding efficiency is decreased due to a decrease in arithmetic operation accuracy.

The present disclosure has been made in view of the foregoing, and an objective is to suppress image quality degradation due to a rounding process by performing the rounding process after a multiply accumulate process for motion compensation and a weighted addition process in view of L0 and L1 motion vector accuracy.

Solutions to Problems

One aspect of the present disclosure is an image processing device including: a motion compensation unit configured to perform motion compensation of sub-pixel accuracy of for each of L0 and L1; a weighted addition unit configured to apply weighted addition to arithmetic operation results by the motion compensation unit; and a rounding processing unit configured to apply a rounding process to an arithmetic operation result by the weighted addition unit.

A determination unit configured to determine accuracy of L0 and L1, and an adjustment unit configured adjust the accuracy based on a determination result of the determination unit can be further include.

The adjustment unit can adjust one accuracy to the other accuracy by multiplying a predetermined coefficient to one of L0 and L1.

The adjustment unit can adjust higher accuracy to lower accuracy between L0 and L1.

The adjustment unit is capable of not performing the adjustment when the accuracy of L0 and the accuracy of L1 are equal to each other.

The adjustment unit can adjust the accuracy based on the accuracy of L0 and the accuracy of L1 both in a horizontal direction and in a vertical direction.

The rounding processing unit can perform a division process of 2X+Y after the arithmetic operation process of the weighted addition unit where a multiplication process for motion vector accuracy adjustment is 2X, and a division process for a weighted prediction process is 2Y.

The weighted addition unit can perform Explicit Weighted Prediction.

The weighted addition unit can perform Implicit Weighted Prediction.

The weighted addition unit can perform Intensity Compensation.

one aspect of the present disclosure is an image processing method of an image processing device including: performing, by a motion compensation unit, motion compensation of sub-pixel accuracy for each of L0 and L1; applying, by a weighted addition unit, weighted addition to arithmetic operation results; and applying, by a rounding processing unit, a rounding process to an arithmetic operation result.

One aspect of the present disclosure, motion compensation of sub-pixel accuracy is performed for each of L0 and L1, arithmetic operation results are subjected to weighted addition, and an arithmetic operation result thereof is subjected to a rounding process.

Effects of the Invention

According to the present disclosure, images can be processed. Especially, the encoding efficiency can be improved.

BRIEF DESCRIPTION OF DRAWINGS

FIG. 2 is a diagram illustrating an example of a decimal-point pixel motion prediction/compensation process.

FIG. 12 is a table describing adjustment of two-dimensional motion vector.

MODE FOR CARRYING OUT THE INVENTION

Hereinafter, embodiments for implementing the invention (hereinafter, embodiments) will be described. The description will be made in the following order.
1. First embodiment (image decoding apparatus);
2. Second embodiment (image encoding device);
3. Third embodiment (personal computer);
4. Fourth embodiment (television receiver);
5. Fifth embodiment (portable telephone device)
6. Sixth embodiment (recording/reproducing device)
7. Seventh embodiment (imaging device)

1. First Embodiment

[Image Encoding Device]

Figure 1:
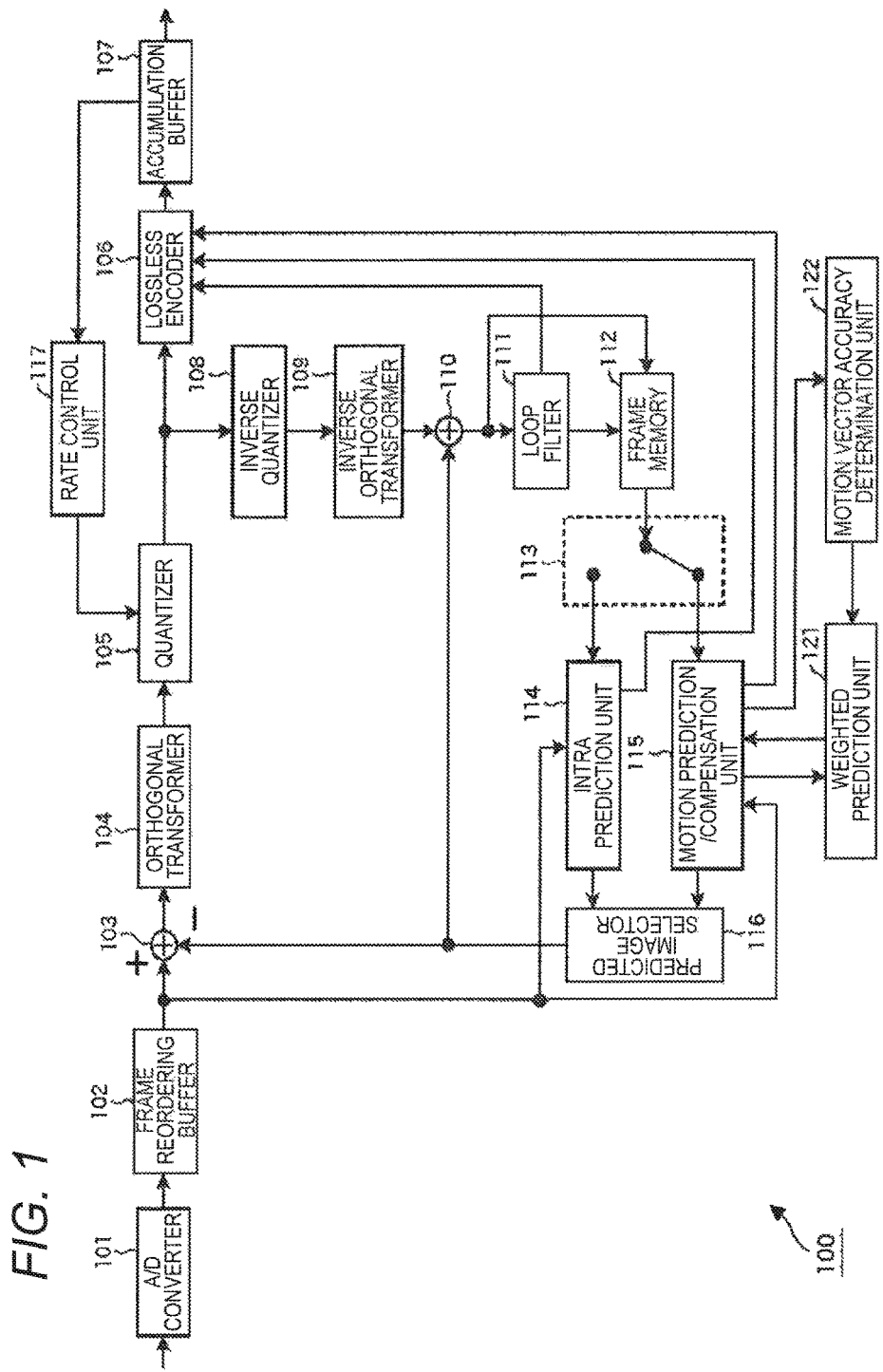
FIG. 1 is a block diagram showing a typical example structure of an image encoding device.

FIG. 1 is a block diagram showing a typical example structure of an image encoding device.

An image encoding device 100 illustrated in FIG. 1 encodes image data using a prediction process such as H.264 and MPEG (Moving Picture Experts Group) 4 Part 10 (AVC (Advanced Video Coding)) encoding format.

As shown in FIG. 1, the image encoding device 100 includes an A/D converter 101, a frame reordering buffer 102, an arithmetic operation unit 103, an orthogonal transformer 104, a quantizer 105, a lossless encoder 106, and an accumulation buffer 107. Further, the image encoding device 100 includes an inverse quantizer 108, an inverse orthogonal transformer 109, an arithmetic operation unit 110, a loop filter 111, a frame memory 112, a selector 113, an intra prediction unit 114, a motion prediction/compensation unit 115, a predicted image selector 116, and a rate controller 117.

Further, the image encoding device 100 includes a weighted prediction unit 121 and a motion vector accuracy determination unit 122.

The A/D converter 101 performs A/D conversion on input image data, supplies the image data (digital data) obtained by the conversion to the frame reordering buffer 102, and stores the image data therein. The frame reordering buffer 102 reorders the stored image with frames in a display order into an encoding order in accordance with a GOP (Group Of Picture), and supplies the image with reordered frames to the arithmetic operation unit 103. The frame reordering buffer 102 supplies the image with the reordered frames to the intra prediction unit 114 and the motion prediction/compensation unit 115.

The arithmetic operation unit 103 subtracts the predicted image supplied from the intra prediction unit 114 or the motion prediction/compensation unit 115 through the predicted image selector 116 from the image read out from the frame reordering buffer 102, and outputs the difference information to the orthogonal transformer 104.

For example, in a case of an image to which intra encoding is applied, the arithmetic operation unit 103 subtracts the predicted image supplied from the intra prediction unit 114 from the image read out from the frame reordering buffer 102. Further, for example, in a case of an image to be subjected to inter encoding, the arithmetic operation unit 103 subtracts the predicted image supplied from the motion prediction/compensation unit 115 from the image read out from the frame reordering buffer 102.

The orthogonal transformer 104 applies orthogonal transform such as discrete cosine transform and Karhunen-Loeve transform to the difference information supplied from the arithmetic operation unit 103. Note that the orthogonal transform may employ any method. The orthogonal transformer 104 supplies the transform coefficient to the quantizer 105.

The quantizer 105 quantizes the transform coefficient supplied from the orthogonal transformer 104. The quantizer 105 sets a quantization parameter on the basis of information on a target value of the code amount supplied from the rate controller 117, and performs quantization thereof. Any method may be used for the quantization. The quantizer 105 supplies the quantized transform coefficient to the lossless encoder 106.

The lossless encoder 106 encodes the transform coefficient quantized by the quantizer 105 according to a coding technique. Since the coefficient data is quantized under control of the rate controller 117, the code amount thereof is the target value set by the rate controller 117 (or approximates the target value).

In addition, the lossless encoder 106 acquires information indicating a mode of the intra prediction and the like from the intra prediction unit 114, and acquires information indicating a mode of the inter prediction, motion vector information, and the like from the motion prediction/compensation unit 115. The lossless encoder 106 further acquires a filter coefficient used by the loop filter 111, etc.

The lossless encoder 106 encodes these various information pieces according to a coding technique, so that the various information pieces are contained as part of header information of encoded data (multiplexes the information pieces). The lossless encoder 106 supplies the encoded data obtained by the encoding to the accumulation buffer 107 and accumulates the encoded data therein.

Examples of the coding technique used by the lossless encoder 106 include variable-length coding and arithmetic coding. Examples of the variable-length coding include CAVLC (Context-Adaptive Variable Length Coding) defined in the H.264/AVC standard. Examples of the arithmetic coding include CABAC (Context-Adaptive Binary Arithmetic Coding).

The accumulation buffer 107 temporarily holds the encoded data supplied from the lossless encoder 106. The accumulation buffer 107 outputs the held encoded data to a downstream recording device (recording medium), a transmission path, or the like that is not shown.

The transform coefficient quantized by the quantizer 105 is also supplied to the inverse quantizer 108. The inverse quantizer 108 inversely quantizes the quantized transform coefficient by a method corresponding to the quantization by the quantizer 105. The inverse quantization may employ any method as long as the method corresponds to the quantization process by the quantizer 105. The inverse quantizer 108 supplies the obtained transform coefficient to the inverse orthogonal transformer 109.

The inverse orthogonal transformer 109 inversely orthogonally transforms the transform coefficient supplied from the inverse quantizer 108 by a method corresponding to the orthogonal transform process by the orthogonal transformer 104. The inverse orthogonal transform may employ any method as long as the method corresponds to the orthogonal transform process by the orthogonal transformer 104. An inversely orthogonally transformed output (restored difference information) is supplied to the arithmetic operation unit 110.

The arithmetic operation unit 110 adds the predicted image supplied from the intra prediction unit 114 or the motion prediction/compensation unit 115 through the predicted image selector 116 to a result of the inverse orthogonal transform supplied from the inverse orthogonal transformer 109, that is, to the restored difference information to obtain a locally reconstructed image (hereinafter, referred to as reconstructed image). The reconstructed image is supplied to the loop filter 111 or the frame memory 112.

The loop filter 111 includes a deblocking filter, an adaptive loop filter or the like, and performs appropriate filtering on the decoded image supplied from the arithmetic operation unit 110. For example, the loop filter 111 performs deblocking filtering on the decoded image to remove block distortion from the decoded image. In addition, for example, the loop filter 111 performs loop filtering on the result of deblocking filtering (the decoded image from which block distortion is removed) by using a Wiener filter to improve the image quality.

Alternatively, the loop filter 111 may perform certain filtering on the decoded image. The loop filter 111 may also supply information such as a filter coefficient used for the filtering, where necessary, to the lossless encoder 106, so that the information will be encoded.

The loop filter 111 supplies a result of the filtering process (hereinafter, referred to as decoded image) to the frame memory 112.

The frame memory 112 stores the decoded image supplied from the arithmetic operation unit 110 or the loop filter 111, and supplies the stored decoded image to the intra prediction unit 114 or the motion prediction/compensation unit 115 through the selector 113 at a predetermined timing as a reference image.

The selector 113 indicates a supply destination of the reference image output from the frame memory 112. For example, in the case of intra prediction, the selector 113 reads out an image (reconstructed image) that has not been subjected to the filtering process from the frame memory 112, and supplies the image to the intra prediction unit 114 as a surrounding pixel.

Further, for example, in the case of inter prediction, the selector 113 reads out an image (decoded image) subjected to the filtering process from the frame memory 112, and supplies the image to the motion prediction/compensation unit 115 as a reference image.

The intra prediction unit 114 obtains the reconstructed image of a surrounding region positioned around a region to be processed from the frame memory 112 as a surrounding image. The intra prediction unit 114 performs intra prediction (in-screen prediction) in which a predicted image of the region to be processed is generated using a pixel value of a surrounding image within the picture to be processed. The intra prediction unit 114 performs the intra prediction in a plurality of modes (intra prediction modes) prepared in advance.

The intra prediction unit 114 generates predicted images in all candidate intra prediction modes, evaluates a cost function value of each predicted image using an input image supplied from the frame reordering buffer 102, and selects an optimal mode. When having selected an optimal intra prediction mode, the intra prediction unit 114 supplies a predicted image generated in the optimal mode to the predicted image selector 116.

The intra prediction unit 114 also supplies intra prediction mode information indicating the employed intra prediction mode and like information, where necessary, to the lossless encoder 106, so that the information will be encoded.

The motion prediction/compensation unit 115 performs motion prediction (inter prediction) of the region to be processed using the input image supplied from the frame reordering buffer 102 and the decoded image (reference image) supplied from the frame memory 112, and performs a motion compensation process in accordance with a detected motion vector to generate a predicted image (inter predicted image information) of the region to be processed. The motion prediction/compensation unit 115 performs the inter prediction in a plurality of modes (inter prediction modes) prepared in advance.

The motion prediction/compensation unit 115 generates predicted images in all candidate inter prediction modes, evaluates a cost function value of each predicted image, and selects an optimal mode. When having selected the optimal inter prediction mode, the motion prediction/compensation unit 115 supplies a predicted image generated in the optimal mode to the predicted image selector 116.

In addition, in decoding information indicating the employed inter prediction mode and the encoded data, the motion prediction/compensation unit 115 supplies necessary information and the like for performing processing in the inter prediction mode to the lossless encoder 106 and allows the lossless encoder 106 to encode the information and the like.

The predicted image selector 116 selects the source of the predicted imaged to be supplied to the arithmetic operation unit 103 and the arithmetic operation unit 110. For example, in the case of intra encoding, the predicted image selector 116 selects the intra prediction unit 114 as the source of the predicted image, and supplies the predicted image supplied from the intra prediction unit 114 to the arithmetic operation unit 103 and the arithmetic operation unit 110. Further, in the case of inter encoding, for example, the predicted image selector 116 selects the motion prediction/compensation unit 115 as the source of the predicted image, and supplies the predicted image supplied from the motion prediction/compensation unit 115 to the arithmetic operation unit 103 and the arithmetic operation unit 110.

The rate controller 117 controls the rate of quantization operation of the quantizer 105 not to generate an overflow or an underflow based on the code amount of the encoded data accumulated in the accumulation buffer 107.

The weighted prediction unit 121 performs processes related to the weighted prediction such as determination of a weight coefficient and adjustment of motion accuracy in the inter prediction mode performed by the motion prediction/compensation unit 115.

The motion vector accuracy determination unit 122 determines the motion accuracy that is accuracy of a motion vector, and supplies a result of the determination to the weighted prediction unit 121 in the inter prediction mode performed by the motion prediction/compensation unit 115.
[¼ Pixel Accuracy Motion Prediction]

Figure 2:
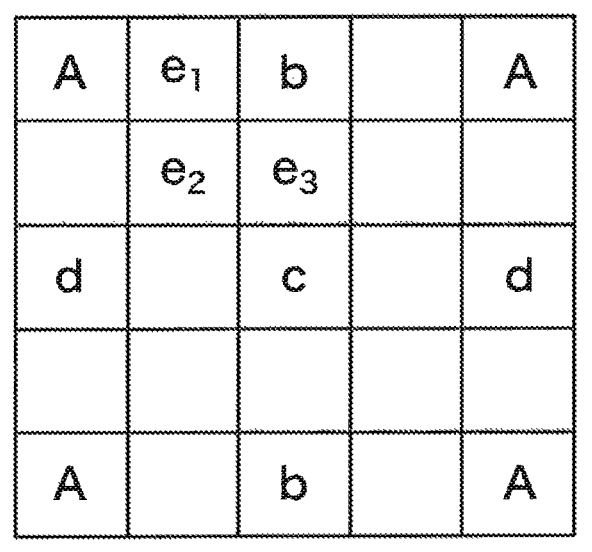

FIG. 2 is a diagram describing an example of a state of a motion prediction/compensation process of ¼ pixel accuracy stipulated in the AVC encoding format. In FIG. 2, each square represents a pixel. Among the pixels, A represents a position of an integer accuracy image stored in the frame memory 112, b, c, and d represent positions of ½ pixel accuracy, and e1, e2, and e3 represent positions of ¼ pixel accuracy.

Hereinafter, a function Clip1( ) is defined as the following formula (1):

[Mathematical Formula 1]

$$\text{Clip1}(a) = \begin{cases} 0; & \text{if}(a < 0) \\ a; & \text{otherwise} \\ \text{max\_pix}; & \text{if}(a > \text{max\_pix}) \end{cases} \quad (1)$$

For example, when the input image is 8 bit accuracy, a value of max_pix of the formula (1) is 255.

The pixel values of the positions b and d are generated by the following formulas (2) and (3) using a FIR filter of 6tap:

[Mathematical Formula 2]

$$F = A_{-2} - 5 \cdot A_{-1} + 20 \cdot A_0 + 20 \cdot A_1 - 5 \cdot A_2 + A_3 \quad (2)$$

[Mathematical Formula 3]

$$b, d = \text{Clip1}((F+16) >> 5) \quad (3)$$

The pixel value at the position c is generated by the following formulas (4) to (6) applying the FIR filter of 6tap in the horizontal direction and the vertical direction:

[Mathematical Formula 4]

$$F = b_{-2} - 5 \cdot b_{-1} + 20 \cdot b_0 + 20 \cdot b_1 - 5 \cdot b_2 + b_3 \quad (4)$$

Alternatively,

[Mathematical Formula 5]

$$F = d_{-2} - 5 \cdot d_{-1} + 20 \cdot d_0 + 20 \cdot d_1 - 5 \cdot d_2 + d_3 \quad (5)$$

[Mathematical Formula 6]

$$c = \text{Clip1}((F+512) >> 10) \quad (6)$$

Note that a Clip process is performed only once in the end after a multiply accumulate process is performed both in the horizontal direction and in the vertical direction.

e1 to e3 are generated by the following formulas (7) to (9) by linear interpolation.

[Mathematical Formula 7]

$$e_1 = (A+b+1) >> 1 \quad (7)$$

[Mathematical Formula 8]

$$e_2 = (b+d+1) >> 1 \quad (8)$$

[Mathematical Formula 9]

$$e_3 = (b+c+1) >> 1 \quad (9)$$

[Macroblock]

Further, in MPEG2, a motion prediction/compensation process is performed in the unit of 16×16 pixels in a case of a frame motion compensation mode, and the unit of 16×8 pixels in each of a first field and a second field in a case of a field motion compensation mode.

Figure 3:
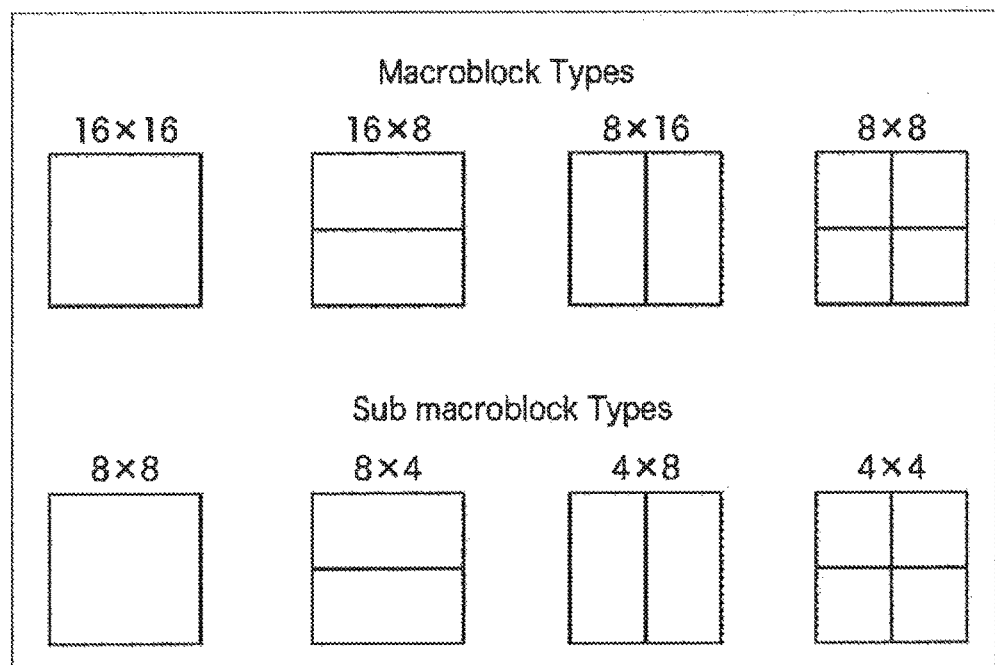
FIG. 3 is a diagram illustrating an example of a macro-block.

In contrast, in AVC, as illustrated in FIG. 3, one macroblock configured from 16×16 pixels is divided into any of 16×16, 16×8, 8×16, and 8×8 partitions, and the partitions can include motion vector information for each sub macroblock independently of each other. Further, an 8×8 partition is, as illustrated in FIG. 3, divided into any of 8×8, 8×4, 4×8, and 4×4 sub blocks, and the sub blocks can include motion vector information independently of each other.

However, if such a motion prediction/compensation process is performed in an AVC image encoding format similarly to the case of MPEG2, a large amount of motion vector information is generated. Further, encoding the generated motion vector information as it is leads to a decrease in encoding efficiency.

[Median Prediction of Motion Vector]

As a technique to solve the problem, a decrease in encoding information of a motion vector is realized by the following method in the AVC image encoding.

Figure 4:
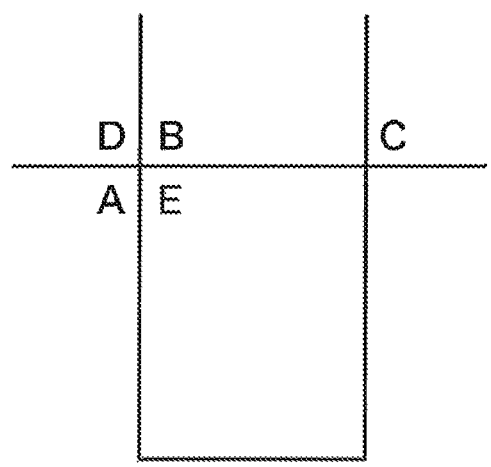
FIG. 4 is a diagram describing an example of a state of a median operation.

Each line illustrated in FIG. 4 indicates a border of a motion compensation block. Further, in FIG. 4, E represents the motion compensation block to be encoded, and A to D respectively represent encoded motion compensation blocks adjacent to E.

Now, the motion vector information with respect to X is $mv_X$ where X=A, B, C, D, and E.

First, prediction motion vector information $pmv_E$ with respect to the motion compensation block E is generated by the following formula (10) by a median operation using motion vector information related to the motion compensation blocks A, B, and C:

[Mathematical Formula 10]

$$pmv_E = \text{med}(mv_A, mv_B, mv_C) \quad (10)$$

When the information related to the motion compensation block C is unavailable for the reason such as the block is positioned in the end of a picture frame, and the like, the information is substituted for information related to the motion compensation block D.

Data $mvd_E$ to be encoded in the image compression information as the motion vector information with respect to the motion compensation block E is generated using $pmv_E$ with the following formula (11):

[Mathematical Formula 11]

$$mvd_E = mv_E - pmv_E \quad (11)$$

Note that an actual process is independently performed with respect to respective components of the motion vector information in the horizontal direction and the vertical direction.

[Multi-Reference Frame]

Further, in AVC, a format called multi-reference frame (multi (a plurality of) reference frame) that has not been stipulated in the conventional image encoding formats such as such as MPEG2 and H.263 is stipulated.

Figure 5:
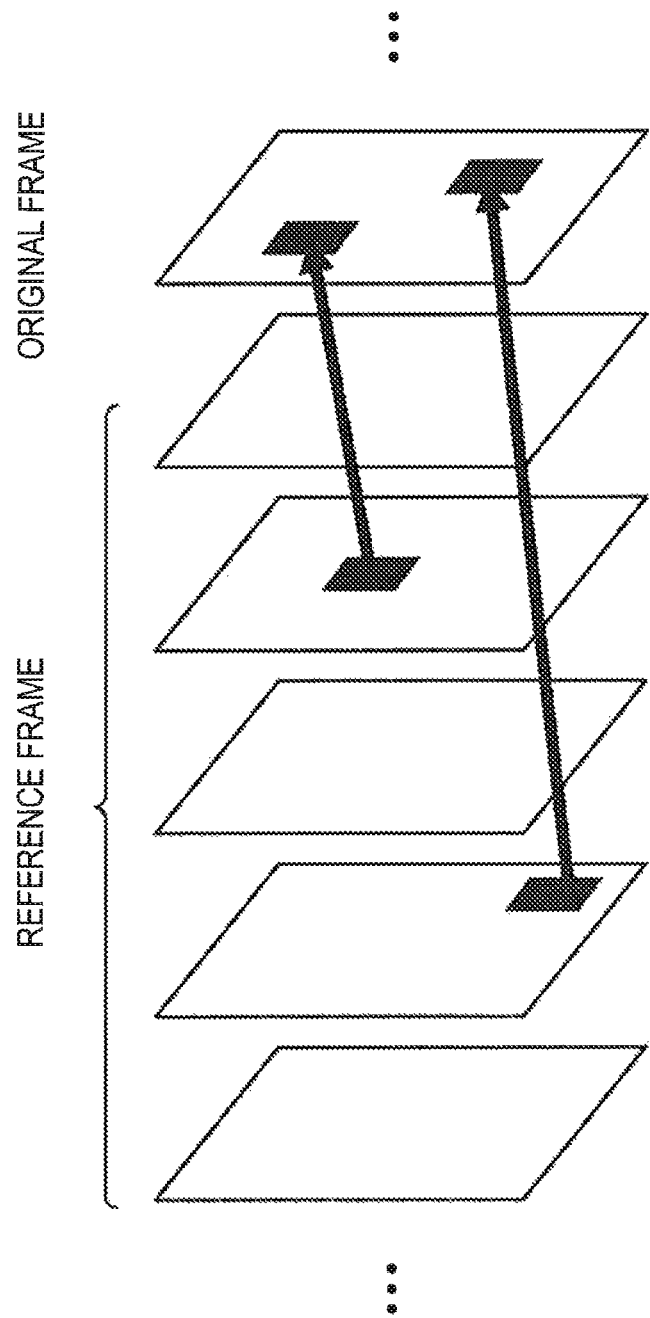
FIG. 5 is a diagram describing an example of a multi-reference frame.

A multi-reference frame stipulated in AVC will be described with reference to FIG. 5.

That is, in MPEG-2 and H.263, in a case of a P picture, the motion prediction/compensation process is performed by reference to only one reference frame stored in a frame memory. In AVC, as illustrated in FIG. 5, a plurality of reference frames is stored in a memory, and a different memory can be referred for each macroblock.

By the way, in MPEG2 and MPEG4, for example, in a sequence in which there is a motion and the brightness is changed, such as a fade scene, an encoding tool for absorbing the change of the brightness is not prepared, and thus the encoding efficiency may be decreased.

To solve the problem, in the AVC encoding format, a weighted prediction process can be performed (see Non-Patent Document 2). That is, in a P picture, a prediction signal is generated with the following formula (12):

$$W_0 \times Y_0 + D \qquad (12)$$

where $Y_0$ is a motion compensation prediction signal, a weight coefficient is $W_0$, and an offset value is D.

Further, in a B picture, a prediction signal is generated with the following formula (13):

$$W_0 \times Y_0 + W_1 \times Y_1 + D \qquad (13)$$

where motion compensation prediction signals with respect to List0 and List1 are $Y_0$ and $Y_1$, the weight coefficients thereof are $W_0$ and $W_1$, respectively, and an offset is D.

In AVC, it is possible to designate whether the weighted prediction is used in units of slices.

Further, in AVC, as the weighted prediction, an Explicit Mode where W and D are transmitted and an Implicit Mode where W is calculated from a distance between the picture and a reference picture on a time axis are stipulated in a slice header.

In a P picture, only the Explicit Mode can be used.

In a B picture, both of the Explicit Mode and the Implicit Mode can be used.

Figure 7:
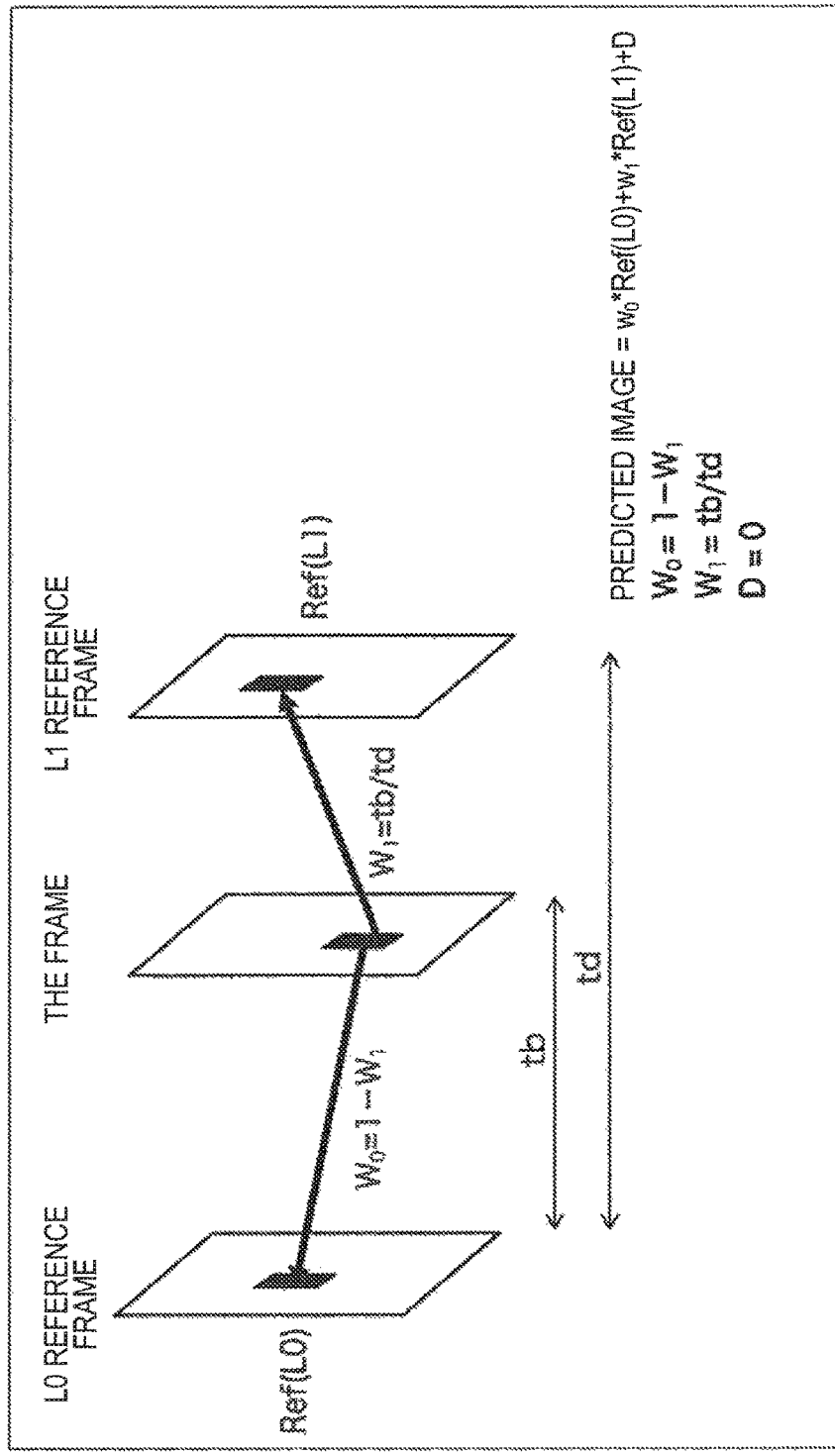
FIG. 7 is a diagram describing an example of a state of weight prediction.

FIG. 7 illustrates a method of calculating W and D in a case of the Implicit Mode in a B picture.

Note that, in a case of AVC, information corresponding to tb and td that is time distance information does not exist, and therefore, a POC (picture order count) is used.

Further, in AVC, the weighted prediction can be applied in units of slices. Further, Non-Patent Document 2 also discloses a method of applying the weighted prediction in units of blocks (intensity compensation).

[Selection of Motion Vector]

By the way, to obtain image compression information having high encoding efficiency by the image encoding device 100 illustrated in FIG. 1, it is important to select the motion vector and the macroblock mode by what kind of process.

As an example of the process, there is a technique incorporated in reference software called JM (Joint Model) publicly available through Fraunhofer Heinrich Hertz Institute Video Coding & Analytics H.264/MPEG4-AVC website's Administrative Support.

Hereinafter, a motion search system incorporated in JM will be described with reference to FIG. 6.

Figure 6:
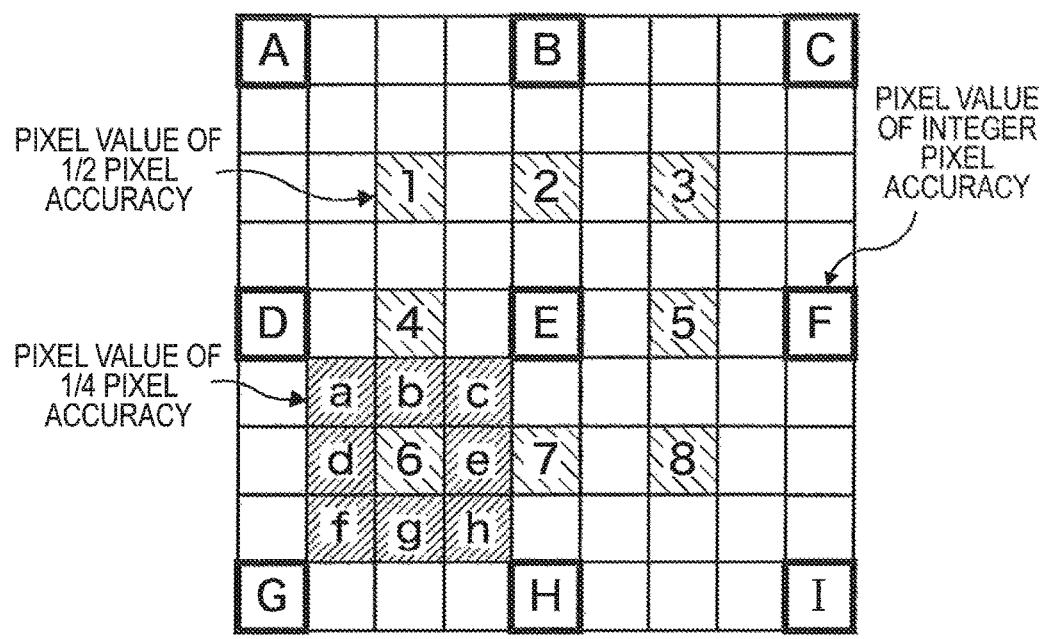
FIG. 6 is a diagram describing an example of a motion search system.

In FIG. 6, A to I represent pixel values of integer pixel accuracy, 1 to 8 represent pixel values of ½ pixel accuracy around E, and a to h represent pixel values of ¼ pixel accuracy around 6.

As a first step, a motion vector of the integer pixel accuracy that minimizes a cost function such as an SAD (sum of absolute difference) is obtained in a predetermined search range. In the example of FIG. 6, assume that E is a pixel corresponding to the motion vector of the integer pixel accuracy.

As a second step, a pixel value that minimizes the cost function among E and the ½ pixel accuracy 1 to 8 around E is obtained, and the pixel value is used as an optimal motion vector of the ½ pixel accuracy. In the example of FIG. 6, assume that 6 is the pixel value corresponding to the optimal motion vector of the ½ pixel accuracy.

As a third step, a pixel value that minimizes the cost function among 6 and the ¼ pixel accuracy a to h around 6 is obtained, and the pixel value is used as the optimal motion vector of the ¼ pixel accuracy.

[Selection of Prediction Mode]

Further, hereinafter, a mode determination system determined in JM will be described.

In JM, two types of mode determination methods: a High Complexity Mode and a Low Complexity Mode described below can be selected. In both modes, a cost function value related to each prediction mode is calculated, and a prediction mode that minimizes the cost function value is selected as an optimal mode for the block or a macroblock.

A cost function in the High Complexity Mode is indicated by the following formula (14):

$$\text{Cost}(\text{Mode} \in \Omega) = D + \lambda * R \qquad (14)$$

Here, $\Omega$ is a universal set of candidate modes for encoding the block or a macroblock, and D is difference energy between a decoded image and an input image when the encoding is performed in the prediction mode. $\lambda$ is a Lagrange multiplier given as a function of a quantization parameter. R is a total code amount including an orthogonal transform coefficient when the encoding is performed in the mode.

That is, when the encoding in the High Complexity Mode is performed, it is necessary to perform a provisional encoding process one in all candidate modes in order to calculate the parameters D and R. Therefore, a higher arithmetic operation amount is required.

The cost function in the Low Complexity Mode is indicated by the following formula (15):

$$\text{Cost}(\text{Mode} \in \Omega) = D + \text{QP2Quant}(\text{QP}) * \text{HeaderBit} \qquad (15)$$

Here, D is difference energy between the predicted image and the input image, which is different from the case of the High Complexity Mode. QP2Quant(QP) is given as a function of a quantization parameter QP, and HeaderBit is a code amount related to information belonging to Header such as a motion vector and a mode, and not including an orthogonal transform coefficient.

That is, in the Low Complexity Mode, it is necessary to perform the prediction process for each candidate mode. However, the decoded image is not necessary, and thus it is not necessary to perform the encoding process. Therefore, the Low Complexity Mode can be realized with a lower arithmetic operation amount than the High Complexity Mode.

[Coding Unit]

By the way, the macroblock size of 16×16 pixels is not the best for large image frames such as UHD (Ultra High Definition: 4000×2000 pixels) that will be handled in next-generation encoding methods.

Figure 8:
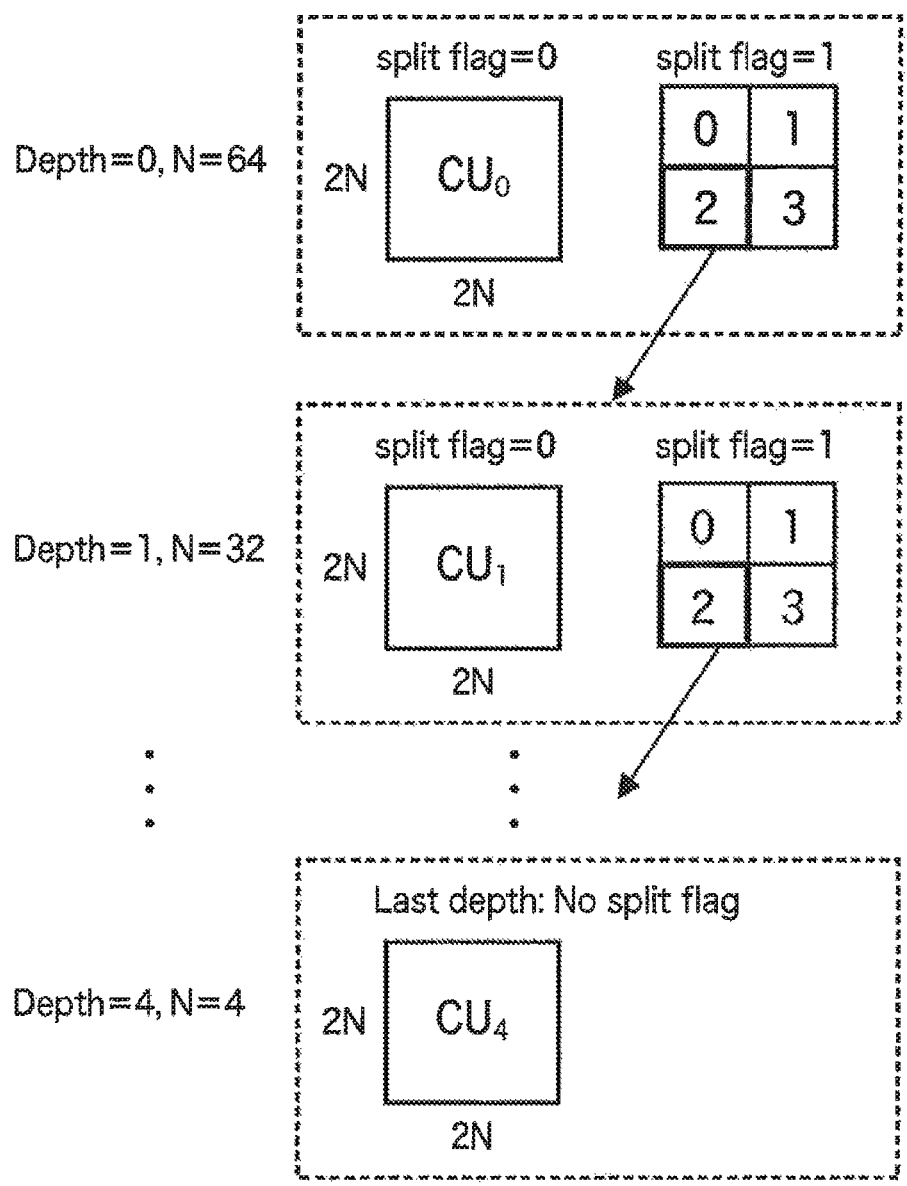
FIG. 8 is a diagram describing a configuration example of a coding unit.

Therefore, in AVC, a hierarchical structure by macroblocks and sub macroblocks is stipulated as illustrated in FIG. 3. However, for example, in HEVC (High Efficiency Video Coding), a coding unit (CU) is stipulated as illustrated in FIG. 8.

The CU is also referred to as coding tree block (CTB), and is a partial region of an image in units of pictures, which functions similarly to the macroblock in AVC. While the latter one is fixed in the size of 16×16 pixels, the former one is not fixed in size, and is designated in each sequence in image compression information.

For example, in a sequence parameter set (SPS) included in encoded data that is an output, a maximum size (LCU (Largest Coding Unit)) and a minimum size ((SCU (Smallest Coding Unit)) of the CU are stipulated.

The CU can be divided into smaller size CUs in each LCU by satisfying split-flag=1 within a range not lower than the SCU size. In the example of FIG. 8, the size of the LCU is 128, and the maximum hierarchical depth is 5. A CU having a size of 2N×2N is divided into a CU having a size of N×N that is one lower hierarchy when the value of split_flag is "1".

Further, the CU is divided into a prediction unit (PU) (partial region of an image in units of pictures) that is a region of a processing unit of intra or inter prediction, and is divided into a transform unit (TU) that is a region of a processing unit of orthogonal transform (partial region of an image in units of pictures). Currently, in HEVC, 16×16 and 32×32 orthogonal transform can be used in addition to 4×4 and 8×8.

As described above, in a case of the encoding format like HEVC where the CU is defined and the CU is used as a unit for performing various processes, the macroblock in AVC can be considered corresponding to the LCU. Note that the CU has a hierarchical structure as illustrated in FIG. 8. Therefore, the size of the LCU at the uppermost hierarchy is typically set to larger than the macroblock in AVC, for example, such as 128×128 pixels.

[Decrease in Arithmetic Operation Accuracy in Rounding Process]

Figure 9:
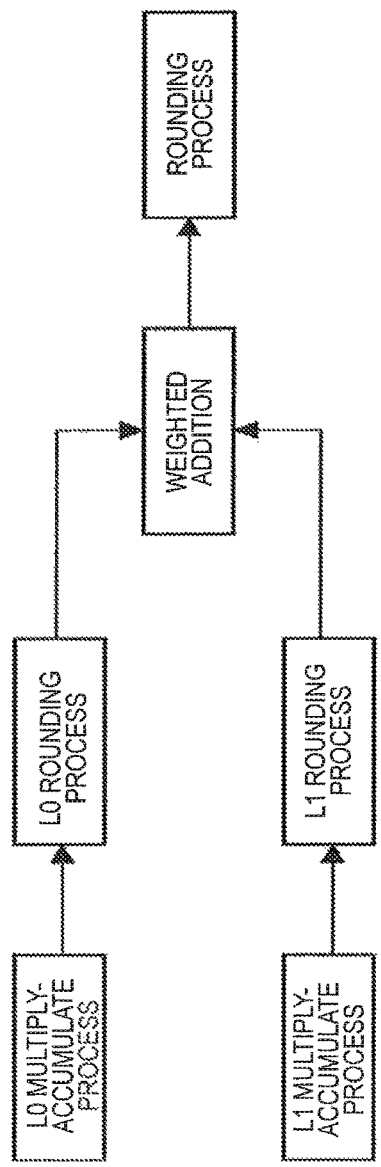
FIG. 9 is a block diagram illustrating an example of an arithmetic operation of weighted prediction.

By the way, such a weighting process performs, as illustrated in FIG. 9, the rounding process for motion compensation, and further performs the rounding process after the weighted addition. Therefore, there is a concern of a decrease in encoding efficiency due to a decrease in arithmetic operation accuracy.

Figure 10:
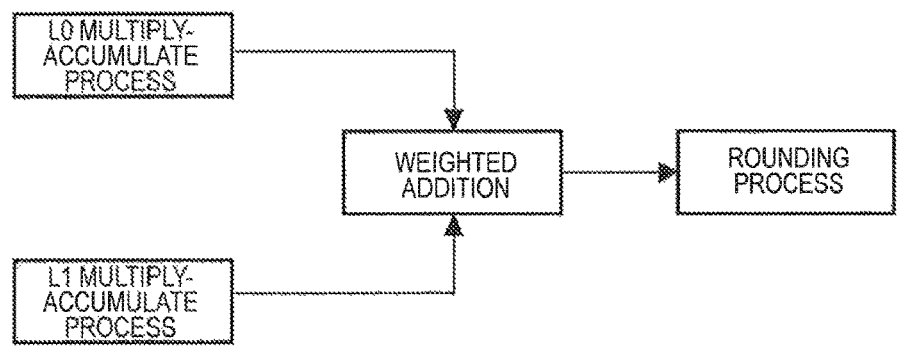
FIG. 10 is a block diagram illustrating another example of an arithmetic operation of the weighted prediction.

Therefore, the motion prediction/compensation unit 115, the weighted prediction unit 121, and the motion vector accuracy determination unit 122 perform the motion compensation process of sub-pixel accuracy, as illustrated in FIG. 10, perform the weighted addition, and then collectively perform the rounding process of the arithmetic operations.

[Motion Prediction/Compensation Unit, Weighted Prediction Unit, Motion Vector Accuracy Determination Unit]

Figure 11:
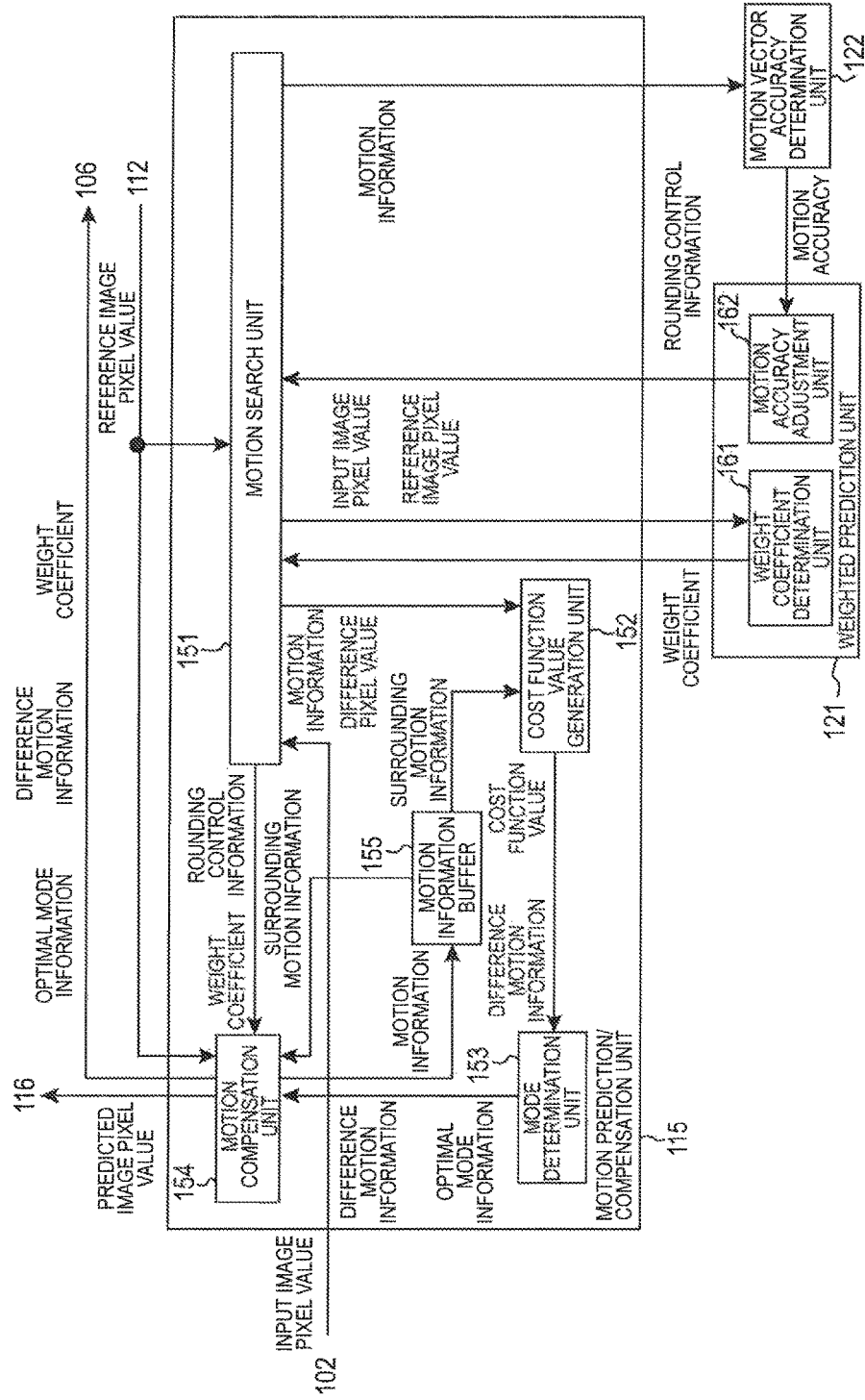
FIG. 11 is a block diagram describing a main configuration example of a motion prediction/compensation unit, a weighted prediction unit, and a motion vector accuracy determination unit.

FIG. 11 is a block diagram illustrating a main configuration example of the motion prediction/compensation unit 115, the weighted prediction unit 121, and the motion vector accuracy determination unit 122 of FIG. 1.

As illustrated in FIG. 11, the motion prediction/compensation unit 115 includes a motion search unit 151, a cost function value generation unit 152, a mode determination unit 153, a motion compensation unit 154, and a motion information buffer 155.

Further, the weighted prediction unit 121 includes a weight coefficient determination unit 161 and a motion accuracy adjustment unit 162.

The motion search unit 151 performs motion search to obtain motion information (motion vector) using an input pixel value acquired from the frame reordering buffer 102 and a reference image pixel value acquired from the frame memory 112.

The motion search unit 151 supplies the input image pixel value acquired from the frame reordering buffer 102 and the reference image pixel value acquired from the frame memory 112 to the weight coefficient determination unit 161 of the weighted prediction unit 121.

The weight coefficient determination unit 161 determines the weight coefficient based on the pixel values, and supplies the weight coefficient to the motion search unit 151.

Note that the motion search unit 151 performs the motion search in all candidate inter prediction modes, and generates motion information. All pieces of searched motion information are supplied to the motion vector accuracy determination unit 122.

The motion vector accuracy determination unit 122 distinguishes information related to motion vector accuracy of L0 and L1, and supplies the accuracy information (motion accuracy) to the motion accuracy adjustment unit 162 of the weighted prediction unit 121. The motion vector accuracy determination unit 122 distinguishes the motion accuracy of the motion information of all inter prediction modes supplied from the motion search unit 151. The motion accuracy adjustment unit 162 determines how to perform the rounding process based on the motion accuracy supplied from the motion vector accuracy determination unit 122, and supplies the rounding control information that controls execution of the rounding process to the motion search unit 151. The motion accuracy adjustment unit 162 generates the rounding control information about the motion accuracy of all inter prediction modes supplied from the motion vector accuracy determination unit 122, and supplies the rounding control information to the motion search unit 151.

The motion search unit 151 performs motion compensation using the weight coefficient and the rounding control information supplied in this way, and generates a predicted image. The motion search unit 151 then obtains a difference (difference image) between the generated predicted image and an input image. The motion search unit 151 supplies a pixel value (difference pixel value) of the obtained difference image to the cost function value generation unit 152 together with the motion information. The motion search unit 151 performs such a process in all inter prediction modes.

The cost function value generation unit 152 calculates a cost function value using the difference pixel value supplied from the motion information search unit 151. Further, the cost function value generation unit 152 acquires, from the motion information buffer 155, surrounding motion information corresponding to the motion information supplied from the motion information search unit 151. The surrounding motion information is motion information of a region (for example, adjacent region) positioned around a region to be processed that is a region corresponding to the motion information. The cost function value generation unit 152 predicts the motion information of the region using the surrounding motion information acquired from the motion information buffer 155, and generates difference motion information that is a difference between the prediction motion information and the motion information searched in the motion search unit 151. The cost function value generation unit 152 performs such a process in all inter prediction modes, and obtains difference motion information and the cost function values.

The cost function value generation unit 152 supplies the cost function value and the difference motion information of each inter prediction mode to the mode determination unit 153.

The mode determination unit 153 determines the inter prediction mode that minimizes the cost function value as an optical inter prediction mode for the region, and supplies optimal mode information indicating the optimal inter prediction mode and the difference motion information of the optimal inter prediction mode to the motion compensation unit 154.

When having acquired the information, the motion compensation unit 154 acquires the rounding control information and the weight coefficient of the optimal inter prediction mode from the motion search unit 151 based on the optimal mode information. In addition, the motion compensation unit 154 acquires the surrounding motion information corresponding to the optimal inter prediction mode from the motion information buffer 155 based on the optimal mode information. The motion compensation unit 154 reconstructs the motion information of the optimal inter prediction mode using the difference motion information and the surrounding motion information.

The motion compensation unit 154 generates a predicted image by performing motion compensation using the information. For example, when performing the weighted prediction, the motion compensation unit 154 performs weighted, addition using the weight coefficient, and applies the rounding process to a result of the weighted addition only once based on the rounding control information.

The motion compensation unit 154 supplies the generated predicted image pixel value to the predicted image selector 116. Further, the motion compensation unit 154 supplies the weight coefficient, the difference motion information, the optimal mode information, and the like to the lossless encoder 106, and causes a bit stream to add the information and to be transmitted to the decoding side.

In addition, the motion compensation unit 154 supplies the motion information of the region to the motion information buffer 155, and causes the motion information buffer 155 to store the information. The motion information is used as surrounding motion information in the inter prediction for other regions to be processed temporally later than the region.

[Details of Motion Compensation]

Next, details of motion compensation will be described.

As described above, the motion compensation unit 154 performs the process of motion compensation of sub-pixel accuracy, the weighted addition, and then the rounding process only once as illustrated in FIG. 10, rather than performing the process of motion compensation of sub-pixel accuracy, the rounding process, the weighted addition, then the rounding process again, as illustrated in FIG. 9.

An example of performing motion compensation of ¼ pixel accuracy like AVC will be described. When the motion compensation of ½ pixel accuracy is performed, a division of $2^H$ is performed at the end as a rounding process. When the motion compensation accuracy of ¼ pixel accuracy is performed, a division of $2^Q$ is performed at the end as a rounding process. Further, finally a division of $2^W$ is performed as a rounding process of the weighted addition. These values of H, Q, and W are all positive integers.

In contrast, the image encoding device 100 adjusts the motion vector accuracy of L0 and L1 in the motion accuracy adjustment unit 162 as a first step. For example, assume that similar or more minute motion compensation of sub-pixel accuracy is performed for LX than LY between LX and LY (X, Y {0, 1}). When LX and LY have the same sub-pixel accuracy, that is, both have integer pixel accuracy, ½ pixel accuracy, or ¼ pixel accuracy, it is not necessary to adjust the accuracy of LX and LY. The motion accuracy adjustment unit 162 generates rounding control information that instructs not to adjust the accuracy of LX and LY.

When LX and LY have different sub-pixel accuracy, the motion accuracy adjustment unit 162 generates the rounding control information to adjust the accuracy of LX and LY as follows.

For example, when LX is integer pixel accuracy, and LY is ½ pixel accuracy, $LX*2^H$ is used in place of LX. For example, when LX is integer pixel accuracy, and LY is ¼ pixel accuracy, $LX*2^Q$ is used in place of LX. Further, for example, when LX is ½ pixel accuracy, and LY is ¼ pixel accuracy, $LX*2^{(Q-H)}$ is used in place of LX.

The description has been given taking one-dimensional example for simplifying the description. However, the actual motion vector information is two-dimensional information. Therefore, the motion accuracy adjustment unit 162 adjusts the accuracy of LX and LY like the table illustrated in FIG. 12 according to accuracy of vertical components and a horizontal components. The table of FIG. 12 indicates adjustment amounts of accuracy according to combinations of the accuracy of the horizontal components and the accuracy of the vertical components of L0 and L1. The lateral direction (the combinations of values in the first row from the top) indicates the combinations of the accuracy of the horizontal components (or vertical components) of L0 and L1, and the vertical direction (the combinations of values in the first column from the left) indicates the combinations of the vertical components (or horizontal components) of L0 and L1.

The motion vector information having lower accuracy and higher accuracy is adjusted such that a value corresponding to a combination of the accuracy of the horizontal components and the accuracy of the vertical components of L0 and L1 indicated in the table of FIG. 12 is multiplied by the motion vector information having lower accuracy. Note that the value "0" in the table of FIG. 12 indicates the adjustment of accuracy is not performed ("0" indicates that multiplication is not performed).

As a second step, the image encoding device 100 performs the weighted addiction process using the weight coefficient in the motion search unit 151 or the motion compensation unit 154 with respect to LX and LY, which have been adjusted as described above.

As a third step, the image encoding device 100 performs the rounding process as follows in the motion search unit 151 or in the motion compensation unit 154. That is, assume that, in the above first step, a multiplication of $2^X$ is necessary for accuracy adjustment of L0 and L1, and in an AVC format, a division of $2^Y$ is necessary for the weighted prediction process. In this case, a division with 2X+Y is performed. As an actual process, it is realized by a shift operation instead of a division.

As described above, the rounding process is brought into one time after the weighted addition. Therefore, the image encoding device 100 can suppress the image quality degradation due to a rounding error and improve the arithmetic operation accuracy, thereby improving the encoding efficiency.

Note that the above method can be applied to both of the Explicit Mode and the Implicit Mode. Further, the above method can also be applied to the Intensity Compensation as proposed in Non-Patent Document 3.

[Flow of Encoding Process]

Next, flows of processes performed by the image encoding device 100 as described above will be described. First, an example of a flow of an encoding process will be described with reference to the flowchart of FIG. 13.

In step S101, the A/D converter 101 performs A/D conversion on an input image. In step S102, the frame reordering buffer 102 stores the image obtained by the A/D conversion and reorders respective pictures in display order into encoding order.

In step S103, the intra prediction unit 114 performs an intra prediction process. In step S104, the motion prediction/compensation unit 115, the weighted prediction unit 121, and the motion vector accuracy determination unit 122 perform an inter motion prediction process. In step S105, the predicted image selector 116 selects either a predicted image generated by the intra prediction or a predicted image generated by the inter prediction.

In step S106, the arithmetic operation unit 103 calculates a difference between an image reordered by the process of step S102 and the predicted image selected by the process of step S105 (generates a difference image). The generated difference image is decreased in data amount compared with the original image. Accordingly, the data amount can be made smaller as compared to a case in which images are directly encoded.

In step S107, the orthogonal transformer 104 orthogonally transforms the difference image generated by the process in step S106. To be specific, orthogonal transform such as discrete cosine transform and Karhunen-Loeve transform is performed, and a orthogonal transform coefficient is output. In step S108, the quantizer 105 quantizes the orthogonal transform coefficient obtained by the processing in step S107.

The difference image quantized in the process of step S108 is locally decoded as follows. In step S109, the inverse quantizer 108 performs inverse quantization on the quantized orthogonal transform coefficient (also referred to as a quantized coefficient) generated by the processing in step S108 with characteristics corresponding to those of the quantizer 105. In step S110, the inverse orthogonal transformer 109 inversely orthogonally transforms the orthogonal transform coefficient obtained by the process of step S109 with a characteristic corresponding to the characteristic of the orthogonal transformer 104. Accordingly, the difference image is restored.

In step S111, the arithmetic operation unit 110 adds the predicted image selected in step S105 to the difference image generated in step S110 to generate a locally decoded image (reconstructed image). In step S112, the loop filter 111 appropriately applies the loop filtering process including the deblocking filtering process and the adaptive loop filtering process to the reconstructed image obtained by the process of step S111 to generate a decoded image.

In step S113, the frame memory 112 stores the decoded image generated by the process of step S112 or the reconstructed image generated by the process of step S111.

In step S114, the lossless encoder 106 encodes the orthogonal transform coefficient quantized by the process of step S108. Specifically, lossless coding such as variable-length coding or arithmetic coding is performed on the difference image. Note that the lossless encoder 106 encodes and adds information related to prediction, information related to quantization, and the like in a bit stream.

In step S115, the accumulation buffer 107 accumulates the bit stream obtained by the process of step S114. The encoded data accumulated in the accumulation buffer 107 is read out as necessary and transmitted to the decoding side via a transmission path or a recording medium.

In step S116, the rate controller 117 controls the rate of the quantization operation of the quantizer 105 not to cause an overflow or an underflow based on the code amount (generated code amount) accumulated in the accumulation buffer 107 by the process of step S115.

The encoding process is terminated when the processing in step S116 ends.

[Flow of Inter Motion Prediction Process]

Figure 13:
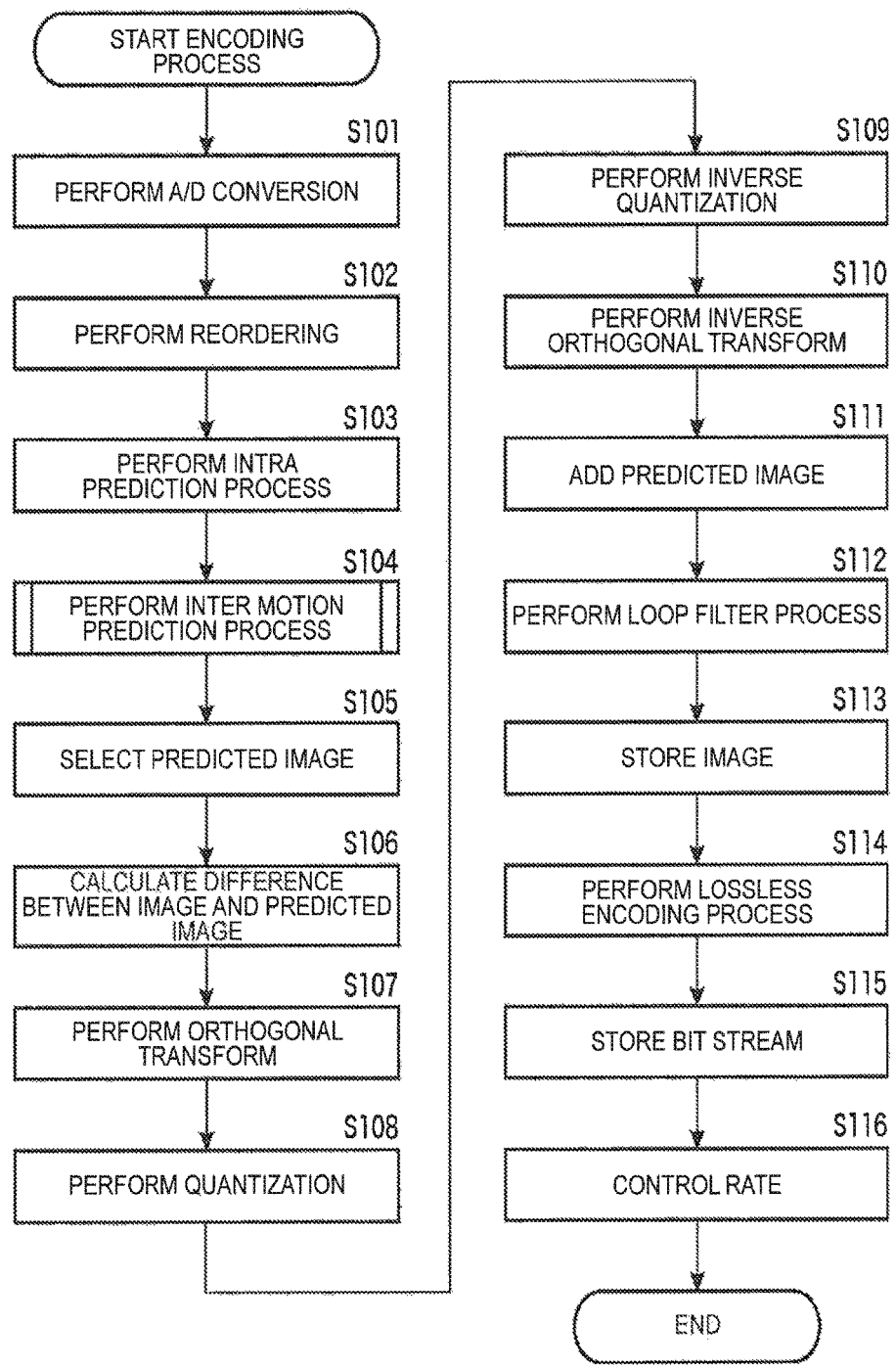
FIG. 13 is a flowchart describing an example of a flow of an encoding process.

Next, an example of a flow of an inter motion prediction process executed in step S104 of FIG. 13 will be described with reference to the flowchart of FIG. 14.

In step S131, the weight coefficient determination unit 161 determines whether the weighted prediction is performed in the slice. When the input image pixel value and the reference image pixel value are compared and luminance change occurs, and the weighted prediction is determined to be performed, the weight coefficient determination unit 161 proceeds with the process to step S132. In step S132, the motion prediction/compensation unit 115, the weighted prediction unit 121, and the motion vector accuracy determination unit 122 perform the weighted prediction process. When the weighted prediction process is complete, the motion prediction/compensation unit 115, the weighted prediction unit 121, and the motion vector accuracy determination unit 122 terminate the inter motion prediction process, and return the process to FIG. 13.

In step S131, when it is determined that the weighted prediction is not to be performed, the motion prediction/compensation unit 115, the weighted prediction unit 121, and the motion vector accuracy determination unit 122 proceeds the process to step S133.

In step S133, the motion search unit 151 performs motion search in each inter prediction mode. In step S134, the cost function value generation unit 152 calculates the cost function value in each inter prediction mode.

In step S135, the mode determination unit 153 determines the optimal inter prediction mode. In step S136, the motion compensation unit 154 performs motion compensation and generates a predicted image in the optimal inter prediction mode.

In step S137, the motion compensation unit 154 outputs the generated predicted image to the predicted image selector 116. In step S138, the motion compensation unit 154 outputs the optimal mode information and the difference motion information to the lossless encoder 106. When the process of step S138 is complete, the motion compensation unit 154 terminates the inter motion prediction process, and returns the process to FIG. 13.

[Flow of Weighted Prediction Process]

Next, an example of a flow of a weighted prediction process executed in step S132 of FIG. 14 will be described with reference to the flowchart of FIG. 15.

In step S151, the weight coefficient determination unit 161 determines the weight coefficient of the slice. In step S152, the motion search unit 151 performs motion search in each inter prediction mode. In step S153, the motion vector accuracy determination unit 122 determines the motion accuracy in each inter prediction mode based on the motion information generated in step S152. In step S154, the motion accuracy adjustment unit 162 adjusts the motion accuracy in each inter prediction mode.

In step S155, the motion search unit 151 performs an interpolation process of each of L0 and L1 in each inter prediction mode. In step S156, the motion search unit 151 performs the weighted addition using the weight coefficient determined in step S151 in each inter prediction mode. In step S157, the motion search unit 151 performs the rounding process in each inter prediction mode.

In step S158, the cost function value generation unit 152 calculates the cost function value in each inter prediction mode. In step S159, the mode determination unit 153 determines the optimal inter prediction mode based on the cost function value.

In step S160, the motion compensation unit 154 performs the interpolation process of each of L0 and L1 in the optimal inter prediction mode. In step S161, the motion compensation unit 154 performs the weighted addition in the optimal inter prediction mode. In step S162, the motion compensation unit 154 applies the rounding process to the motion accuracy and the weighted addition in the optimal inter prediction mode.

In step S163, the motion compensation unit 154 outputs the generated predicted image to the predicted image selector 116. In step S165, the motion compensation unit 154 outputs the optimal mode information, the difference motion information, and the weight coefficient to the lossless encoder 106 and causes the lossless encoder 106 to encode the information.

Figure 14:
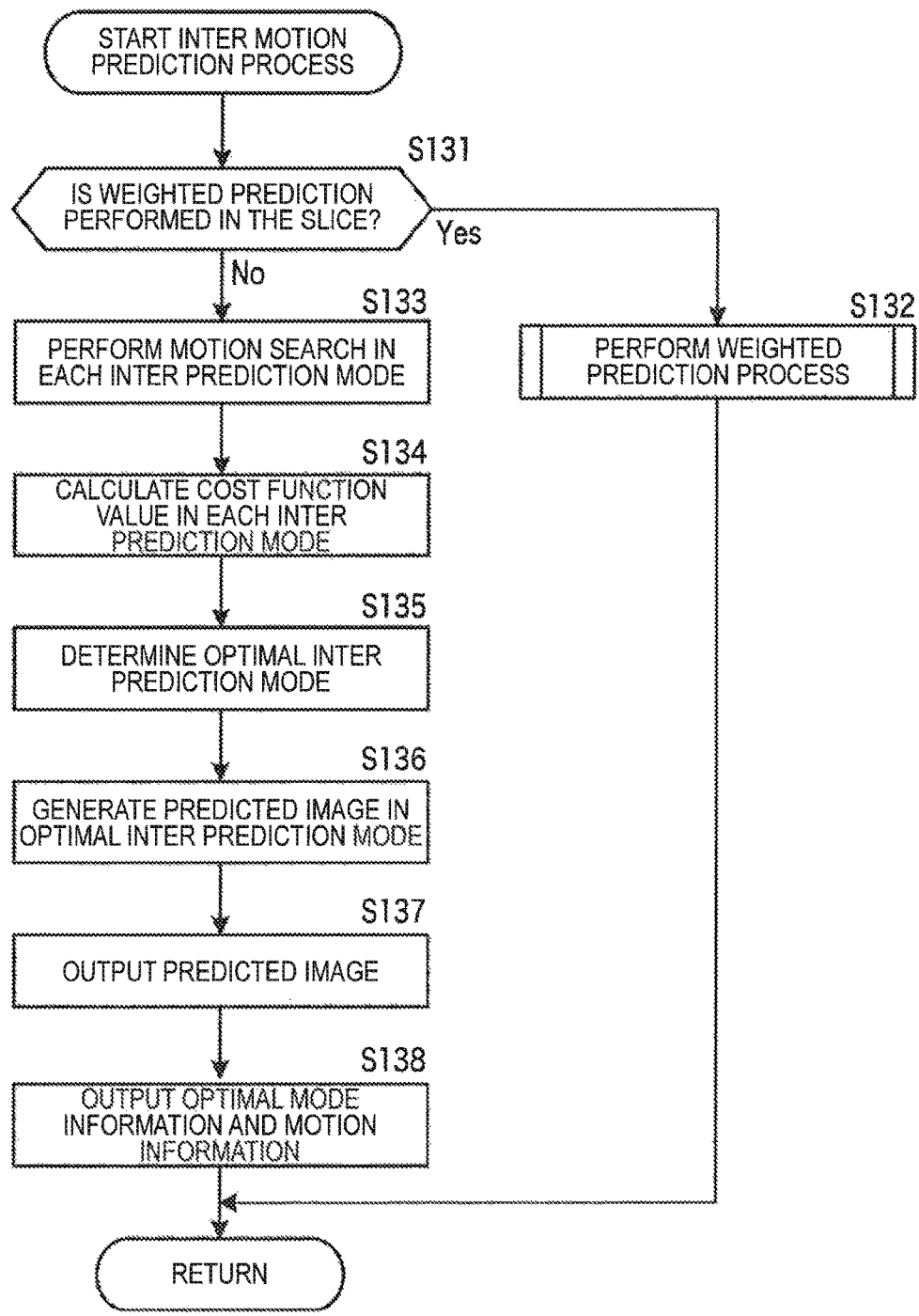
FIG. 14 is a flowchart describing an example of a flow of an inter motion prediction process.
Figure 15:
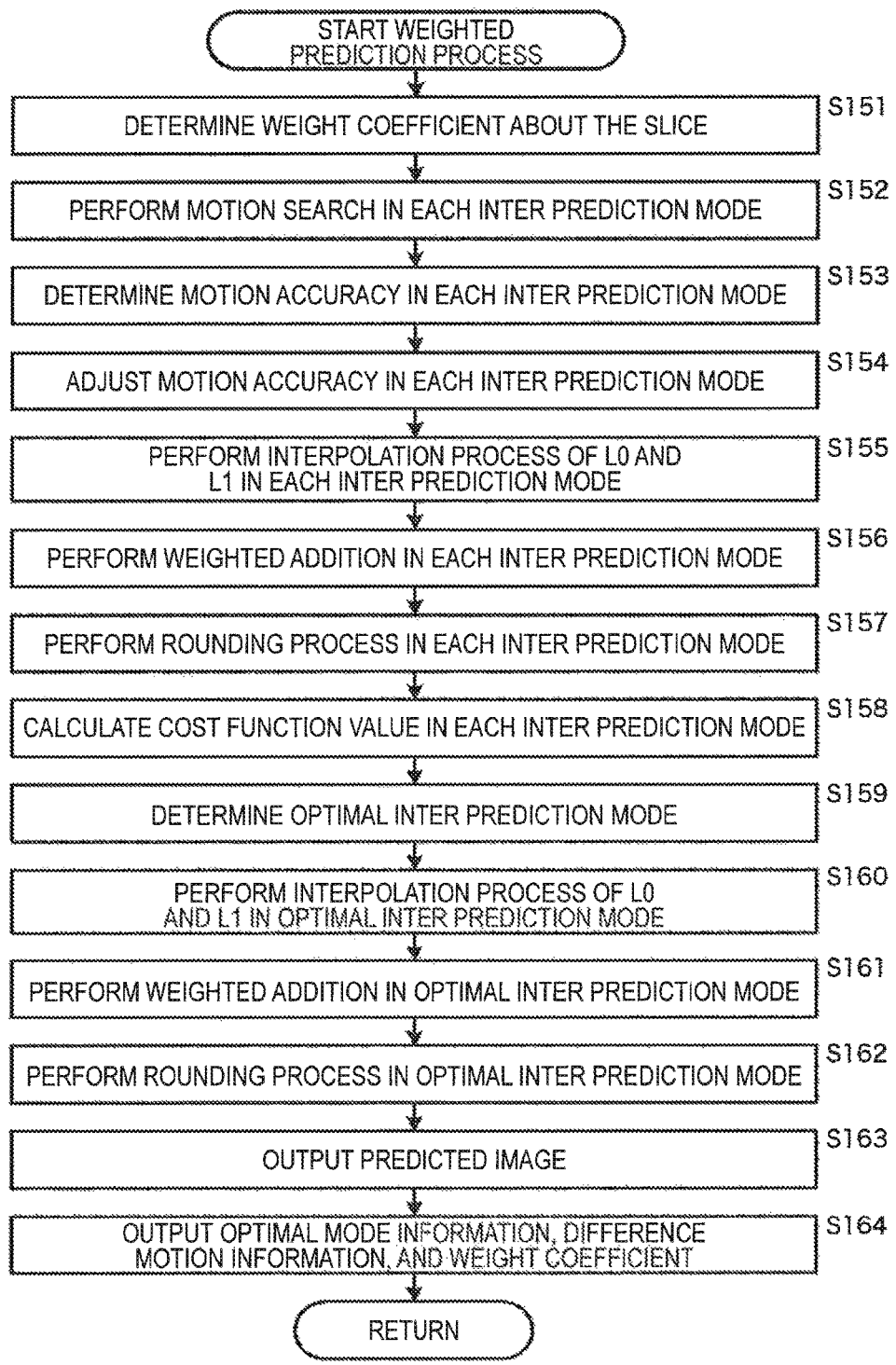
FIG. 15 is a flowchart describing an example of a flow of a weighted prediction process.

When the process of step S165 is complete, the motion compensation unit 154 terminates the weighted prediction process, and returns the process to FIG. 14.

By performing the various processes as described above, the image encoding device 100 collectively performs the rounding process once after the weighted addition to suppress the image quality degradation due to a rounding error, and to improve the arithmetic operation accuracy, thereby improving the encoding efficiency.

2. Second Embodiment

[Image Decoding Device]

Figure 16:
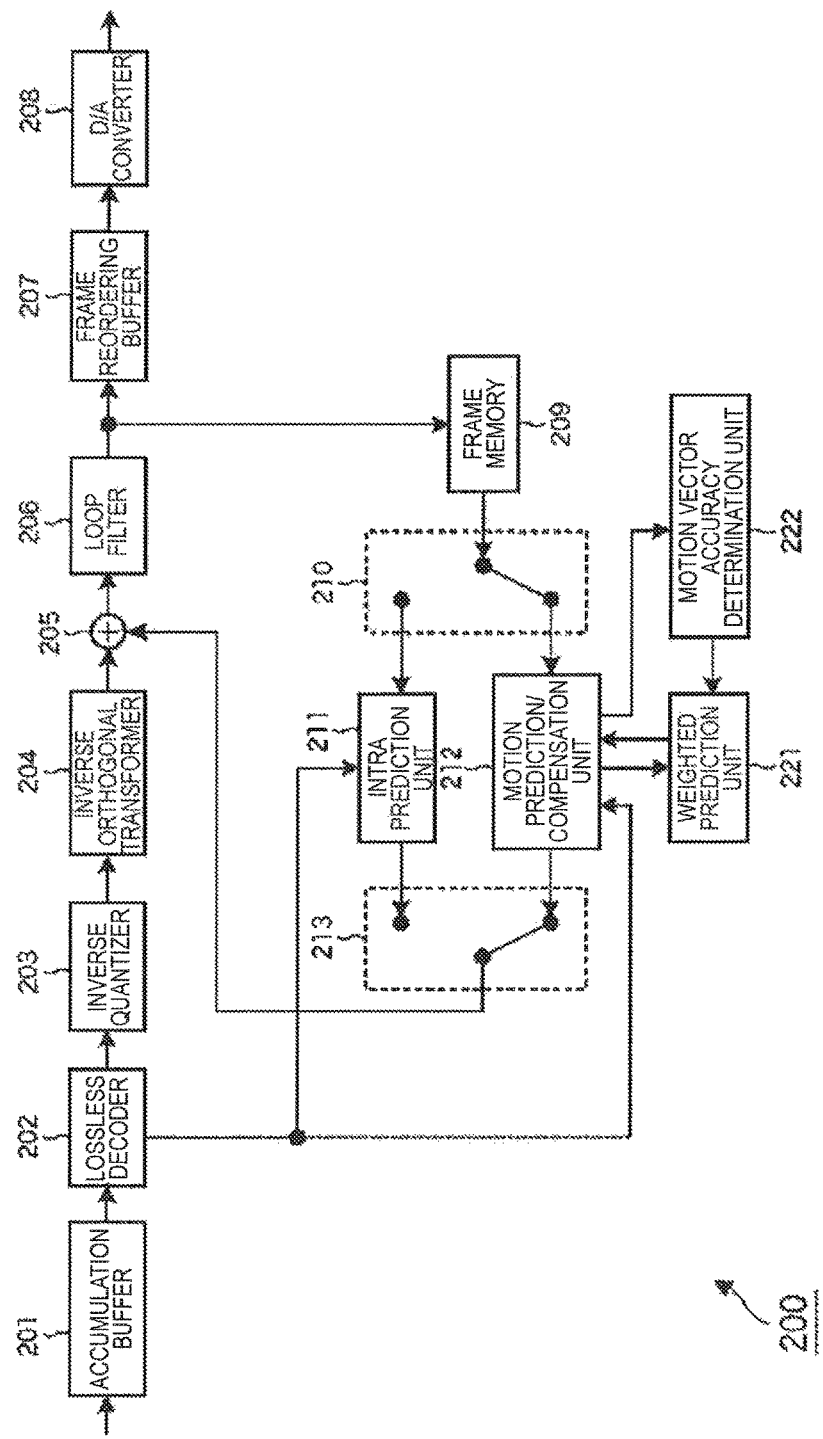
FIG. 16 is a block diagram illustrating a main configuration example of an image decoding device.

Next, decoding of the encoded data encoded as described above will be described. FIG. 16 is a block diagram illustrating a main configuration example of an image decoding device corresponding to the image encoding device 100 of FIG. 1.

An image decoding device 200 illustrated in FIG. 16 decodes the encoded data generated by the image encoding device 100 by a decoding method corresponding to the encoding method.

As illustrated in FIG. 16, the image decoding device 200 includes an accumulation buffer 201, a lossless decoder 202, an inverse quantizer 203, an inverse orthogonal transformer 204, an arithmetic operation unit 205, a loop filter 206, a frame reordering buffer 207, and a D/A converter 208. Further, the image decoding device 200 includes a frame memory 209, a selector 210, an intra prediction unit 211, a motion prediction/compensation unit 212, and a selector 213.

Further, the image decoding device 200 includes a weighted prediction unit 221 and a motion vector accuracy determination unit 222.

The accumulation buffer 201 accumulates transmitted encoded data, and supplies the encoded data to the lossless decoder 202. The lossless decoder 202 decodes the information encoded by the lossless encoder 106 of FIG. 1 and supplied from the accumulation buffer 201 by a format corresponding to the encoding format of the lossless encoder 106. The lossless decoder 202 supplies quantized coefficient data of a difference image obtained by decoding to the inverse quantizer 203.

In addition, the lossless decoder 202 determines whether the intra prediction mode is selected or the inter prediction mode is selected as the optimal prediction mode, and supplies information related to the optimal prediction mode to a mode that has been determined to be selected between the intra prediction unit 211 and the motion prediction/compensation unit 212. That is, for example, when the image encoding device 100 selects the intra prediction mode as the optimal prediction mode, intra prediction information that is the information related to the optimal prediction mode is supplied to the intra prediction unit 211. Further, for example, when the image encoding device 100 selects the inter prediction mode as the optimal prediction mode, inter prediction information that is the information related to the optimal prediction mode is supplied to the motion prediction/compensation unit 212.

The inverse quantizer 203 performs inverse quantization on the quantized coefficient data obtained by decoding by the lossless decoder 202 according to a technique corresponding to the quantization technique of the quantizer 105 in FIG. 1, and supplies the resulting coefficient data to the inverse orthogonal transformer 204. The inverse orthogonal transformer 204 performs inverse orthogonal transform on the coefficient data supplied from the inverse quantizer 203 according to a technique corresponding to the orthogonal transform technique of the orthogonal transformer 104 in FIG. 1. The inverse orthogonal transformer 204 obtains a difference image corresponding to a difference image before the orthogonal transform by the inverse orthogonal transform process in the image encoding device 100.

The difference image obtained by the inverse orthogonal transform is supplied to the arithmetic operation unit 205. In addition, the predicted image is supplied to the arithmetic operation unit 205 through the selector 213 from the intra prediction unit 211 or the motion prediction/compensation unit 212.

The arithmetic operation unit 205 adds the difference image and the predicted image, and obtains a reconstructed image corresponding to an image before the predicted image is subtracted by the arithmetic operation unit 103 of the image encoding device 100. The arithmetic operation unit 205 supplies the reconstructed image to the loop filter 206.

The loop filter 206 appropriately applies a loop filtering process including a deblocking filtering process, an adaptive loop filtering process, and the like to the supplied reconstructed image to generate a decoded image. For example, the loop filter 206 removes block distortion by applying a deblocking filtering process to the reconstructed image. Further, for example, the loop filter 206 improves image quality by applying a loop filtering process to a result of the deblocking filtering process (reconstructed image, from which block distortion has been removed) using a Wiener filter.

Note that the filtering process performed by the loop filter 206 may be an arbitrary type, and a filtering process other than the above may be performed. Furthermore, the loop filter 206 may perform filtering by using a filter coefficient supplied from the image encoding device 100 of FIG. 1.

The loop filter 206 supplies a decoded image that is a result of the filtering process to the frame reordering buffer 207 and the frame memory 209. Note that the filtering process by the loop filter 206 may be omitted. That is, an output of the adding unit 205 can be stored in the frame memory 209 without being subjected to the filtering process. For example, the intra prediction unit 211 uses a pixel value of a pixel included in the image as a pixel value of a surrounding pixel.

The frame reordering buffer 207 reorders the supplied decoded image. Specifically, the frames reordered into the encoding order by the frame reordering buffer 102 in FIG. 1 are reordered into the original display order. The D/A converter 208 applies D/A conversion to the decoded image supplied from the frame reordering buffer 207, and outputs to and displays in a display (not illustrated).

The frame memory 209 stores a supplied reconstructed image and decoded image. In addition, the frame memory 209 supplies the stored reconstructed image and decoded image to the intra prediction unit 211 and the motion prediction/compensation unit 212 at a predetermined timing or based on a request from outside such as the intra prediction unit 211 and the motion prediction/compensation unit 212.

The intra prediction unit 211 performs a process basically similar to the intra prediction unit 114 of FIG. 1. Note that the intra prediction unit 211 applies intra prediction only to a region where a prediction image is generated by intra prediction when encoding is performed.

The motion prediction/compensation unit 212 performs inter prediction basically similarly to the motion prediction/compensation unit 115. However, the motion prediction/compensation unit 212 applies inter prediction only to a region where inter prediction is performed when encoding is performed based on the inter prediction information supplied from the lossless decoder 202. The motion prediction/compensation unit 212 supplies the generated predicted image to the selector 213.

The selector 213 supplies the predicted image supplied from the intra prediction unit 211 or the predicted image supplied from the motion prediction/compensation unit 212 to the arithmetic operation unit 205.

[Motion Prediction/Compensation Unit, Weighted Prediction Unit, and Motion Vector Accuracy Determination Unit]

Figure 17:
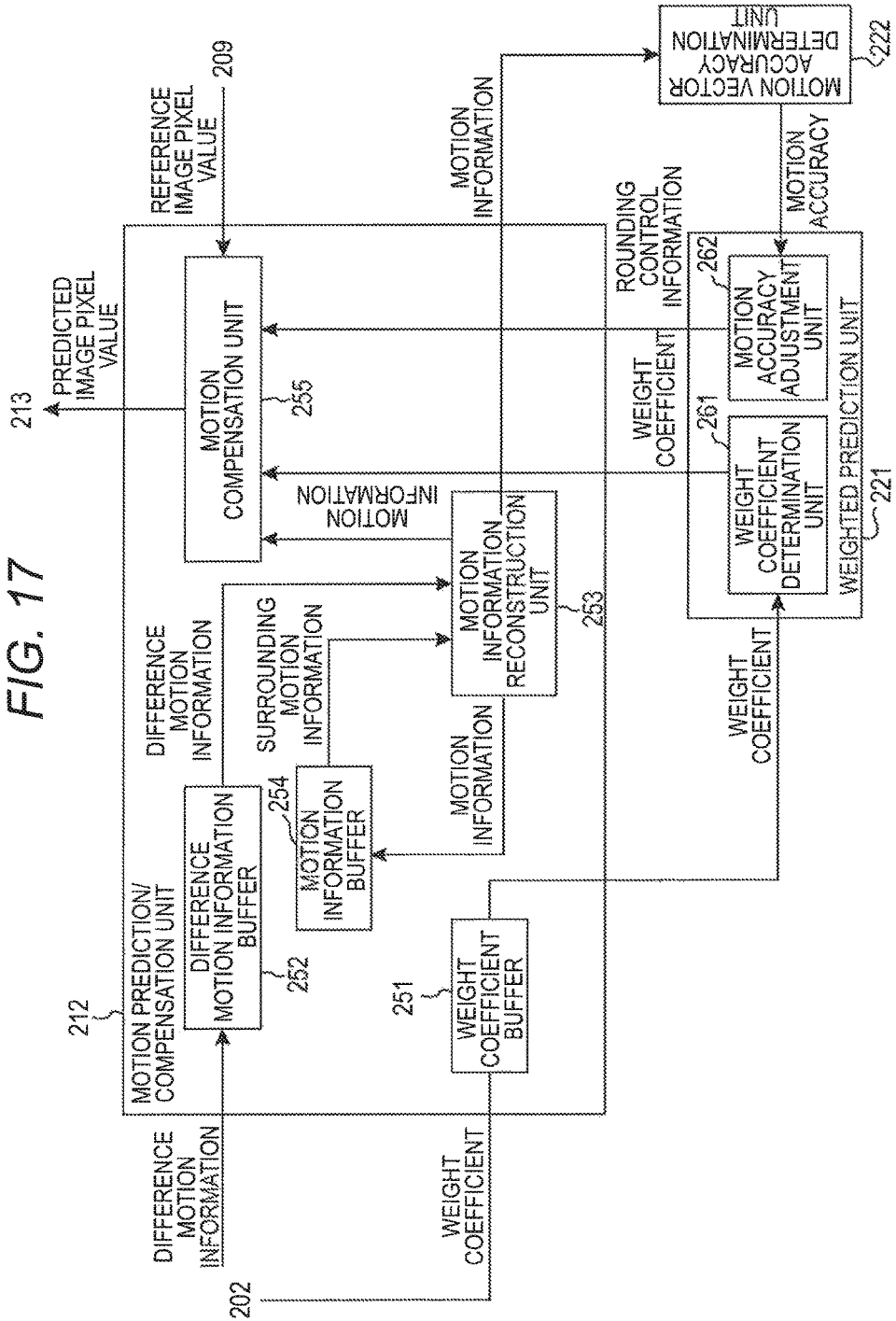
FIG. 17 is a block diagram describing a main configuration example of a motion prediction/compensation unit, a weighted prediction unit, and a motion vector accuracy determination unit.

FIG. 17 is a block diagram illustrating a main configuration example of the motion prediction/compensation unit 212, the weighted prediction unit 221, and the motion vector accuracy determination unit 222 of FIG. 16.

As illustrated in FIG. 17, the motion prediction/compensation unit 212 includes a weight coefficient buffer 251, a difference motion information buffer 252, a motion information reconstruction unit 253, a motion information buffer 254, and a motion compensation unit 255.

Further, the weighted prediction unit 221 includes a weight coefficient determination unit 261 and a motion accuracy adjustment unit 262.

The motion prediction/compensation unit 212 performs a process basically similar to the motion prediction/compensation unit 115 of the image encoding device 100. The motion prediction/compensation unit 212 applies inter prediction only to a region subjected to inter prediction when encoding is performed based on the information included in the bit stream and transmitted from the encoding side.

That is, the motion prediction/compensation unit 212 reconstructs the motion information using the difference motion information supplied from the lossless decoder 202, and performs motion compensation. In addition, the weight coefficient to be used in the weighted prediction is added in the bit stream and supplied from the encoding side.

The weight coefficient buffer 251 acquires and stores the weight coefficient extracted from the bit stream in the lossless decoder 202, and supplies the stored weight coefficient to the weight coefficient determination unit 261 of the weighted prediction unit 221 at a predetermined timing or based on a request from outside.

The difference motion information buffer 252 acquires and stores the difference motion information extracted from the bit stream in the lossless decoder 202. The difference motion information buffer 252 supplies the stored difference motion information to the motion information reconstruction unit 253 at a predetermined timing or based on a request from outside.

When the motion information reconstruction unit 253 acquires the difference motion information from the difference motion information buffer 252, the motion information reconstruction unit 253 acquires surrounding motion information corresponding to the difference motion information from the motion information buffer 254 and reconstructs motion information of the region using the information. The motion information reconstruction unit 253 supplies the reconstructed motion information to the motion compensation unit 255 and the motion vector accuracy determination unit 222.

In this way, the motion information is reconstructed using the difference motion information supplied from the encoding side. Therefore, the above-described rounding process is omitted only when the motion compensation is performed by the motion compensation unit 255.

The motion vector accuracy determination unit 222 determines motion accuracy of the motion information supplied from the motion information reconstruction unit 253 similarly to the case of the motion vector accuracy determination unit 122. The motion accuracy adjustment unit 262 acquires a result of the determination (motion accuracy) and generates rounding control information based on the information, similarly to the case of the motion accuracy adjustment unit 162.

Further, the weight coefficient determination unit 261 supplies the weight coefficient acquired from the weight coefficient buffer 251 to the motion compensation unit 255. Note that the weight coefficient may be calculated in the image decoding device 200. For example, in a case of the Implicit mode, the weight coefficient determination unit 261 calculates the weight coefficient of the slice.

The motion information buffer 254 acquires and stores the motion information reconstructed in the motion information reconstruction unit 253. The stored motion information is returned to the motion information reconstruction unit 253 as the motion information of a surrounding region.

The motion compensation unit 255 performs motion compensation appropriately using the motion information supplied from the motion information reconstruction unit 253, the weight coefficient supplied from the weight coefficient determination unit 261, the rounding control information supplied from the motion accuracy adjustment unit 262, and the reference image pixel value supplied from the frame memory 209, and generates a predicted image. Therefore, the motion compensation unit 255 applies the weighted prediction only to a region subjected to weighted prediction when encoding is performed to generate the predicted image.

The generation of the predicted image in the motion compensation is performed basically similarly to the case of the image encoding device 100 of FIG. 1. That is, the motion compensation unit 255 collectively performs the rounding process once after the weighted prediction in the weighted prediction. In doing so, the motion compensation unit 255 can suppress the image quality degradation due to a rounding error and can improve the arithmetic operation accuracy. Therefore, the image decoding device 200 can improve the encoding efficiency.

[Flow of Decoding Process]

Next, flows of processes performed by the image decoding device 200 as described above will be described. First, an example of a flow of a decoding process will be described with reference to the flowchart of FIG. 18.

In step S201, when the decoding process is started, the accumulation buffer 201 accumulates the transmitted bit stream. In step S202, the lossless decoder 202 decodes the bit stream (encoded difference image information) supplied from the accumulation buffer 201.

At this time, various types of information included in the bit stream such as the intra prediction information and the inter prediction information other than the difference image information are decoded.

In step S203, the inverse quantizer 203 performs inverse quantization on the quantized orthogonal transform coefficient obtained by the processing in step S202. In step S204, the inverse orthogonal transformer 204 performs inverse orthogonal transform on the orthogonal transform coefficient obtained by the inverse quantization in step S203.

In step S205, the intra prediction unit 211 or the motion prediction/compensation unit 212 performs the prediction process using the supplied information. In step S206, the selector 213 selects a predicted image generated in step S205. In step S207, the arithmetic operation unit 205 adds the predicted image selected in step S206 to the difference image information obtained by the inverse orthogonal transform in step S204. Accordingly, a reconstructed image is generated.

In step S208, the loop filter 206 appropriately applies the loop filtering process including the deblocking filtering process and the adaptive loop filter to the reconstructed image obtained in step S207.

In step S209, the frame reordering buffer 207 reorders the decoded image generated by being subjected to the filtering process in step S208. Specifically, the frames reordered into the encoding order by the frame reordering buffer 102 of the image encoding device 100 are reordered into the original display order.

In step S210, the D/A converter 208 applies D/A conversion to the decoded image having the reordered frames. The decoded image is output to and displayed in a display (not illustrated).

In step S211, the frame memory 209 stores the decoded image obtained by being subjected to the filtering process in step S209. The decoded image is used as a reference image in the inter prediction process.

The decoding process is terminated when the processing in step S211 is terminated.

[Flow of Prediction Process]

Figure 18:
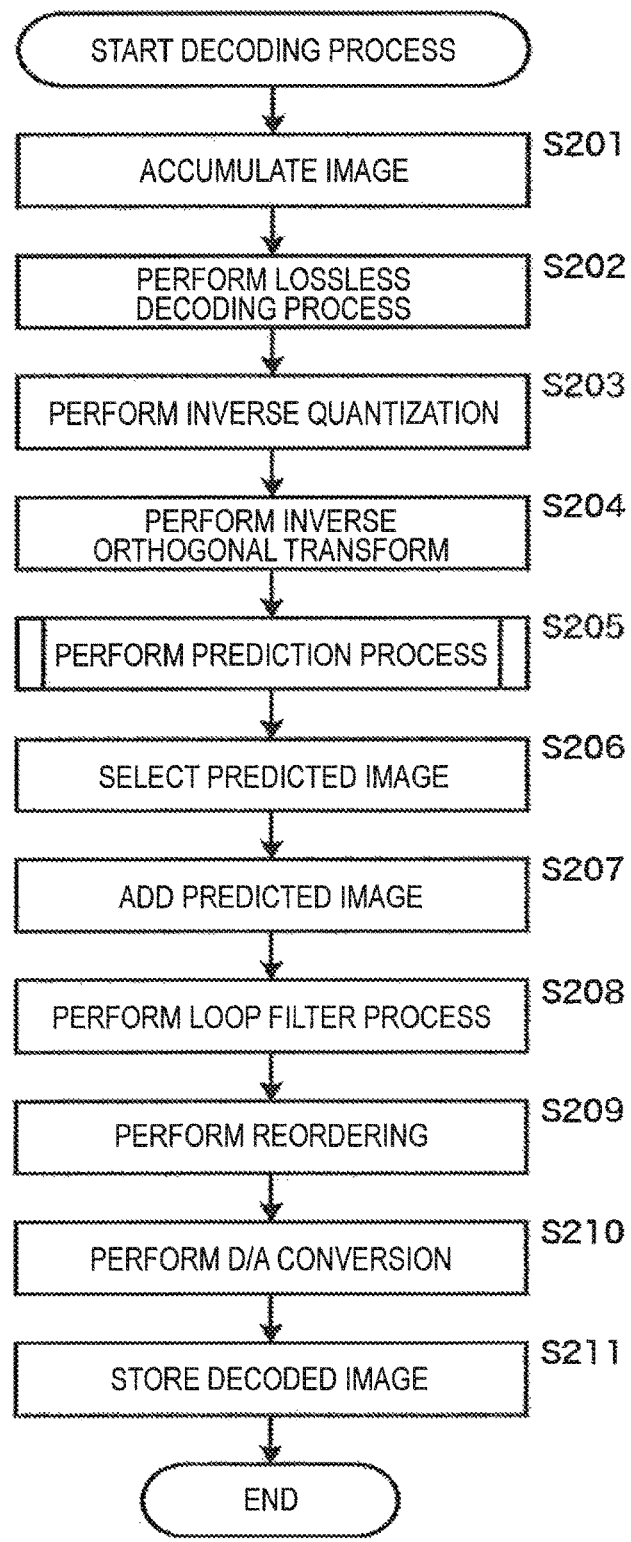
FIG. 18 is a flowchart describing an example of a flow of a decoding process.
Figure 19:
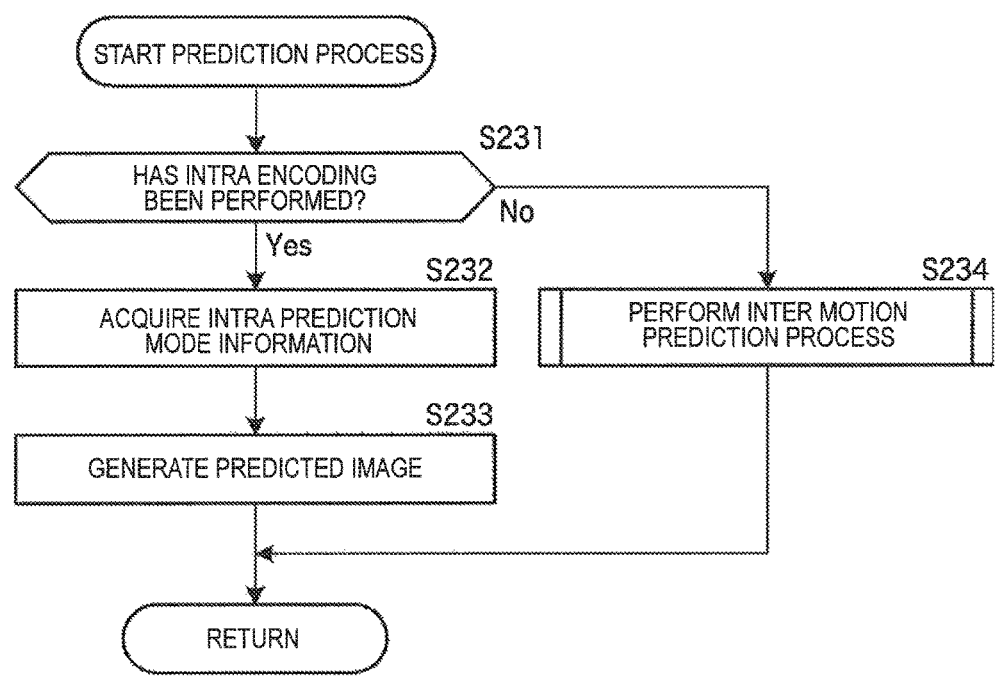
FIG. 19 is a flowchart describing an example of a flow of a prediction process.

Next, an example of a flow of a prediction process executed in step S205 of FIG. 18 will be described with reference to the flowchart of FIG. 19.

When the prediction process is started, in step S231, the intra prediction unit 211 determines whether the intra prediction has been performed when a region to be processed is encoded based on the intra prediction information supplied from the lossless decoder 202 or the inter prediction information. When having determined the intra prediction has been performed, the intra prediction unit 211 proceeds with the process to step S332.

In this case, the intra prediction unit 211 acquires the intra prediction mode information in step S232 and generates a predicted image by the intra prediction in step S233. When having generated the predicted image, the intra prediction unit 211 terminates the prediction process and returns the process to FIG. 18.

In step S231, when having determined the region is a region subjected to the inter prediction, the process proceeds in step S234. In step S234, the motion prediction/compensation unit 212, the weighted prediction unit 221, and the motion vector accuracy determination unit 222 perform the inter motion prediction process. When the inter motion prediction process is complete, the motion prediction/compensation unit 212, the weighted prediction unit 221, and the motion vector accuracy determination unit 222 terminates the prediction process, and returns the process to FIG. 18.

[Flow of Inter Motion Prediction Process]

Figure 20:
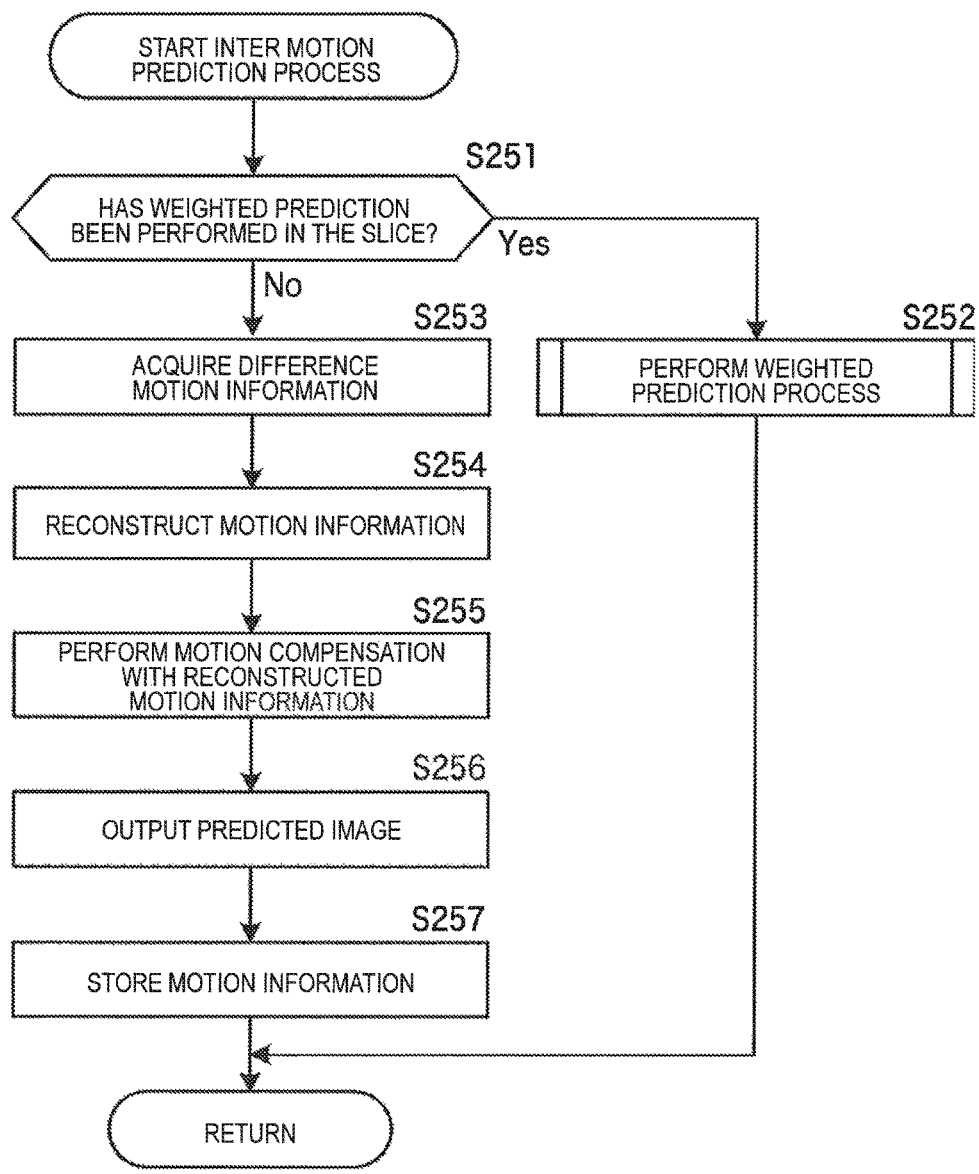
FIG. 20 is a flowchart describing an example of a flow of an inter motion prediction process.

Next, an example of a flow of an inter motion prediction process executed in step S234 of FIG. 19 will be described with reference to the flowchart of FIG. 20.

When the inter motion prediction process is started, in step S251, the weight coefficient determination unit 261 determines whether the weighted prediction has been performed in the slice. When having determined that the weighted prediction has been performed, the weight coefficient determination unit 261 proceeds with the process to step S252.

In step S252, the motion prediction/compensation unit 212, the weighted prediction unit 221, and the motion vector accuracy determination unit 222 performs the weighted prediction process. When the weighted prediction process is complete, the motion prediction/compensation unit 212, the weighted prediction unit 221, and the motion vector accuracy determination unit 222 terminates the inter motion prediction process, and returns the process to FIG. 19.

In step S251, when having determined the weighted prediction has not been performed, the weight coefficient determination unit 261 proceeds with the process to step S253. In step S253, the difference motion information buffer 252 acquires the difference motion information.

In step S254, the motion information reconstruction unit 253 reconstructs motion information. In step S255, the motion compensation unit 255 reconstructs motion information using the reconstructed motion information.

In step S256, the motion compensation unit 255 outputs the generated predicted image to the arithmetic operation unit 205. In step S257, the motion information buffer 254 stores the reconstructed motion information. When the process of step S257 is complete, the motion information buffer 254 terminates the inter motion prediction process, and returns the process to FIG. 19.

[Flow of Weighted Prediction Process]

Figure 21:
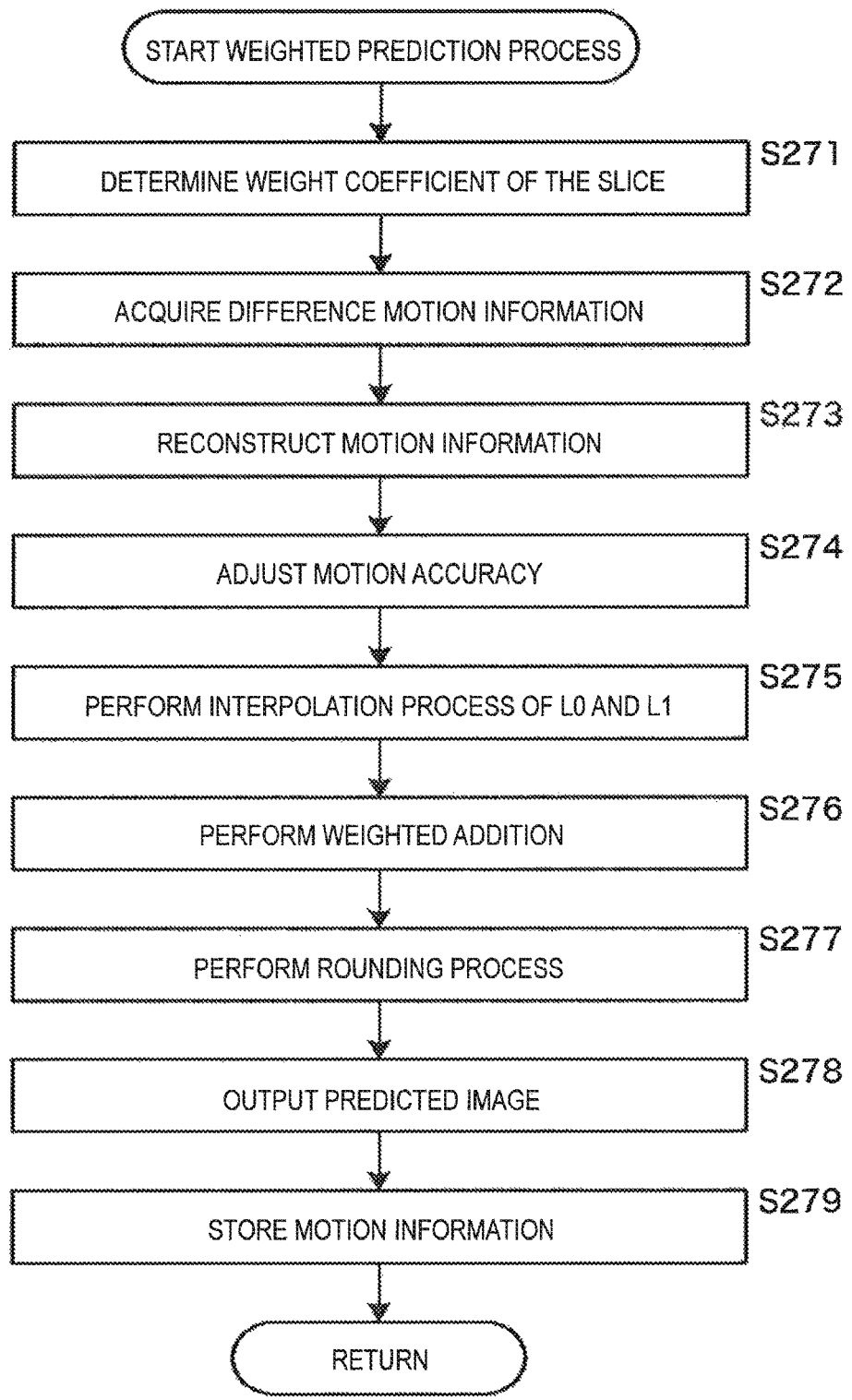
FIG. 21 is a flowchart describing an example of a flow of a weighted prediction process.

Next, an example of a flow of the weighted prediction process executed in step S252 of FIG. 20 will be described with reference to the flowchart of FIG. 21.

In step S271, the weight coefficient determination unit 261 determines the weight coefficient with respect to the slice. In step S272, the difference motion information buffer 252 acquires the difference motion information. In step S273, the motion information reconstruction unit 253 reconstructs the motion information using the difference motion information.

In step S274, the motion accuracy adjustment unit 262 adjusts the motion accuracy determined by the motion vector accuracy determination unit 222.

In step S275, the motion compensation unit 255 performs interpolation process of each of L0 and L1. In step S276, the motion compensation unit 255 performs weighted addition of L0 and L1. In step S277, the motion compensation unit 255 performs a rounding process.

In step S278, the motion compensation unit 255 outputs the predicted image generated as described above. In step S279, the motion information buffer 254 stores the motion information. When the process of step S279 ends, the motion information buffer 254 terminates the weighted prediction process, and returns the process to FIG. 20.

By executing the various processes as described above, the image decoding device 200 collectively performs the rounding process once after the weighted addition to suppress the image quality degradation due to a rounding error, thereby improving the arithmetic operation accuracy. Accordingly, the image decoding device 200 can realize the improvement of the encoding efficiency.

The present technique can be applied to image encoding devices and image decoding devices used for receiving image information (bit stream) compressed using orthogonal transform such as discrete cosine transform and motion compensation as in MPEG or H.26x, for example, via network media such as satellite broadcasting, cable television, the Internet, or portable telephone devices. The present technique can also be applied to image encoding devices and image decoding devices that are used when compressed image information is processed on a storage medium such as an optical or magnetic disk or a flash memory. Further, the present technology can be applied to an intra prediction device and the like included in the image encoding device and the image decoding device.

3. Third Embodiment

[Personal Computer]

The series of processes described above can be performed either by hardware or by software. When the series of processes described above is performed by software, programs constituting the software are installed in a computer. Note that examples of the computer include a computer embedded in dedicated hardware and a general-purpose personal computer capable of executing various functions by installing various programs therein.

Figure 22:
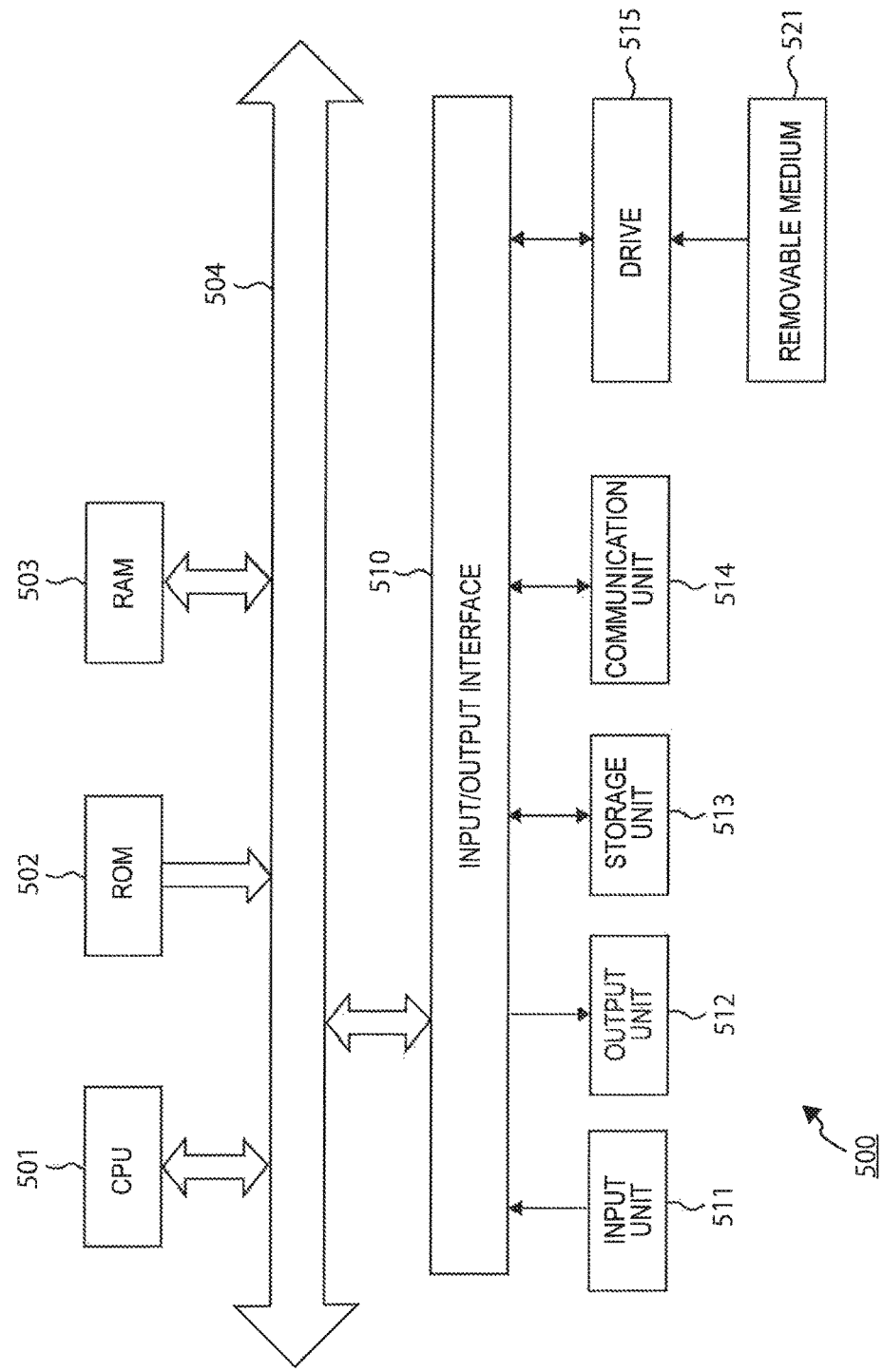
FIG. 22 is a block diagram illustrating a main configuration example of a personal computer.

In FIG. 22, the central processing unit (CPU) 501 of the personal computer 500 executes various processes according to a program stored in the read only memory (ROM) 502 or a program loaded on the random access memory (RAM) 503 from the storage unit 513. The RAM 503 also stores data necessary for the CPU 501 to perform various processes and the like as necessary.

The CPU 501, the ROM 502, and the RAM 503 are connected to one another via a bus 504. An input/output interface 510 is also connected to the bus 504.

The input/output interface 510 has the following components connected thereto: an input unit 511 including a keyboard, a mouse, or the like; an output unit 512 including a display such as a CRT (cathode ray tube) or a LCD (liquid crystal display), and a speaker; the storage unit 513 including a hard disk or the like; and a communication unit 514 including a modem or the like. The communication unit 514 performs communications via networks including the Internet.

A drive 515 is also connected to the input/output interface 510 where necessary, a removable medium 521 such as a magnetic disk, an optical disk, a magneto-optical disk, or a semiconductor memory is mounted on the drive as appropriate, and a computer program read from such a removable disk is installed in the storage unit 513 where necessary.

When the above described series of processes is performed by software, the programs constituting the software are installed from a network or a recording medium.

As illustrated in an example in FIG. 22, for example, the recording medium is configured by: the removable medium 521 including the magnetic disk (including a flexible disk), the optical disk (including a CD-ROM (Compact Disc-Read Only Memory) and a DVD (Digital Versatile Disc)), the magneto-optical disk (including an MD (Mini Disc)), or the semiconductor memory in which a program is recorded and that is distributed to deliver the program to a user separately from the device body; the ROM 502 in which the program is recorded and that is delivered to a user with being incorporated in the device body in advance; and the hard disk included in the storage unit 513.

Programs to be executed by the computer may be programs for carrying out processes in chronological order in accordance with the sequence described in this specification, or programs for carrying out processes in parallel or at necessary timing such as in response to a call.

In this specification, steps describing programs to be recorded in a recording medium include processes to be performed in parallel or independently of one another if not necessarily in chronological order, as well as processes to be performed in chronological order in accordance with the sequence described herein.

In this specification, a system refers to the entirety of equipment including more than one device.

Furthermore, any structure described above as one device (or one processing unit) may be divided into two or more devices (or processing units). Conversely, any structure described above as two or more devices (or processing units) may be combined into one device (or processing unit). Furthermore, it is of course possible to add components other than those described above to the structure of any of the devices (or processing units). Furthermore, some components of a device (or processing unit) may be incorporated into the structure of another device (or processing unit) as long as the structure and the function of the system as a whole are substantially the same. That is, the present technique is not limited to the embodiments described above, but various modifications may be made thereto without departing from the scope of the technique.

The image encoding devices and the image decoding devices according to the embodiments described above can be applied to various electronic devices such as transmitters and receivers in satellite broadcasting, cable broadcasting such as cable TV, distribution via the Internet, distribution to terminals via cellular communication, or the like, recording devices configured to record images in media such as magnetic discs and flash memory, and reproduction devices configured to reproduce images from the storage media. Four examples of applications will be described below.

4. Fourth Embodiment

[First Application: Television Receiver]

Figure 23:
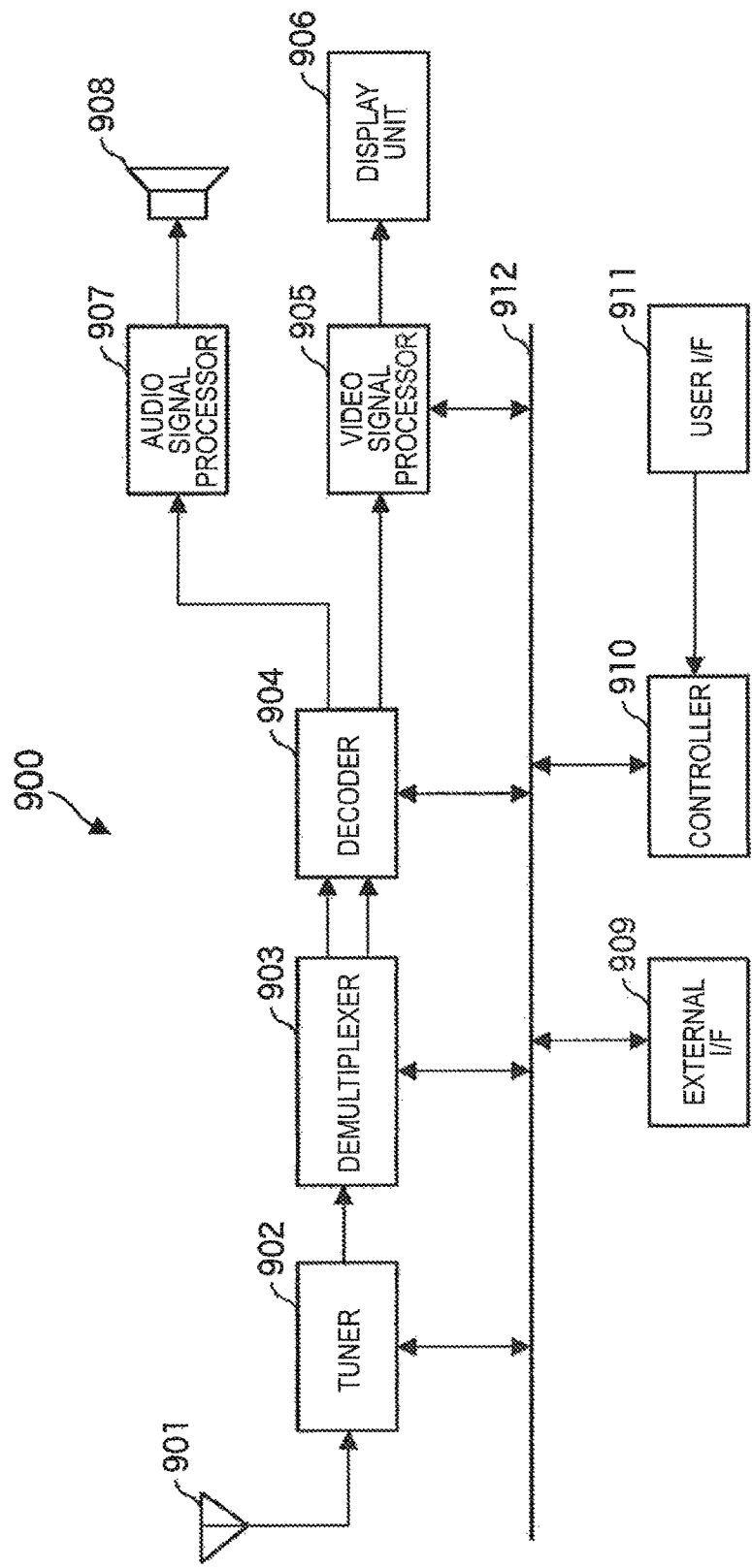
FIG. 23 is a block diagram illustrating an example of a schematic configuration of a television apparatus.

FIG. 23 illustrates an example of a schematic configuration of a television apparatus to which the above-described embodiment is applied. The television apparatus 900 includes an antenna 901, a tuner 902, a demultiplexer 903, a decoder 904, a video signal processor 905, a display unit 906, an audio signal processor 907, a speaker 908, an external interface 909, a controller 910, a user interface 911, and a bus 912.

The tuner 902 extracts a signal of a desired channel from broadcast signals received via the antenna 901, and demodulates the extracted signal. The tuner 902 then outputs an encoded bit stream obtained by the demodulation to the demultiplexer 903. That is, the tuner 902 serves as transmitting means in the television apparatus 900 that receives an encoded stream of encoded images.

The demultiplexer 903 separates a video stream and an audio stream of a program to be viewed from the encoded bit stream, and outputs the separated streams to the decoder 904. The demultiplexer 903 also extracts auxiliary data such as an EPG (electronic program guide) from the encoded bit stream, and supplies the extracted data to the controller 910.

If the encoded bit stream is scrambled, the demultiplexer 903 may descramble the encoded bit stream.

The decoder 904 decodes the video stream and the audio stream input from the demultiplexer 903. The decoder 904 then outputs video data generated by the decoding to the video signal processor 905. The decoder 904 also outputs audio data generated by the decoding to the audio signal processor 907.

The video signal processor 905 reproduces video data input from the decoder 904, and displays the video data on the display unit 906. The video signal processor 905 may also display an application screen supplied via the network on the display unit 906. Furthermore, the video signal processor 905 may perform additional processing such as noise removal on the video data depending on settings. The video signal processor 905 may further generate an image of a GUI (graphical user interface) such as a menu, a button or a cursor and superimpose the generated image on the output images.

The display unit 906 is driven by a drive signal supplied from the video signal processor 905, and displays video or images on a video screen of a display device (such as a liquid crystal display, a plasma display, or an OELD (organic electroluminescence display).

The audio signal processor 907 performs reproduction processing such as D/A conversion and amplification on the audio data input from the decoder 904, and outputs audio through the speaker 908. Furthermore, the audio signal processor 907 may perform additional processing such as noise removal on the audio data.

The external interface 909 is an interface for connecting the television apparatus 900 with an external device or a network. For example, a video stream or an audio stream received via the external interface 909 may be decoded by the decoder 904. That is, the external interface 909 also serves as transmitting means in the television apparatus 900 that receives an encoded stream of encoded images.

The controller 910 includes a processor such as a CPU, and a memory such as a RAN and a ROM. The memory stores programs to be executed by the CPU, program data, EPG data, data acquired via the network, and the like. Programs stored in the memory are read and executed by the CPU when the television apparatus 900 is activated, for example. The CPU controls the operation of the television apparatus 900 according to control signals input from the user interface 911, for example, by executing the programs.

The user interface 911 is connected to the controller 910. The user interface 911 includes buttons and switches for users to operate the television apparatus 900 and a receiving unit for receiving remote control signals, for example. The user interface 911 detects operation by a user via these components, generates a control signal, and outputs the generated control signal to the controller 910.

The bus 912 connects the tuner 902, the demultiplexer 903, the decoder 904, the video signal processor 905, the audio signal processor 907, the external interface 909, and the controller 910 to one another.

In the television apparatus 900 having such a structure, the decoder 904 has the functions of the image decoding devices according to the embodiments described above. Accordingly, in encoding and decoding an image in the television apparatus 900, the image quality degradation due to a rounding error is suppressed, so that the arithmetic operation accuracy can be improved, and the encoding efficiency can be improved.

5. Fifth Embodiment

[Second Application: Portable Telephone Device]

Figure 24:
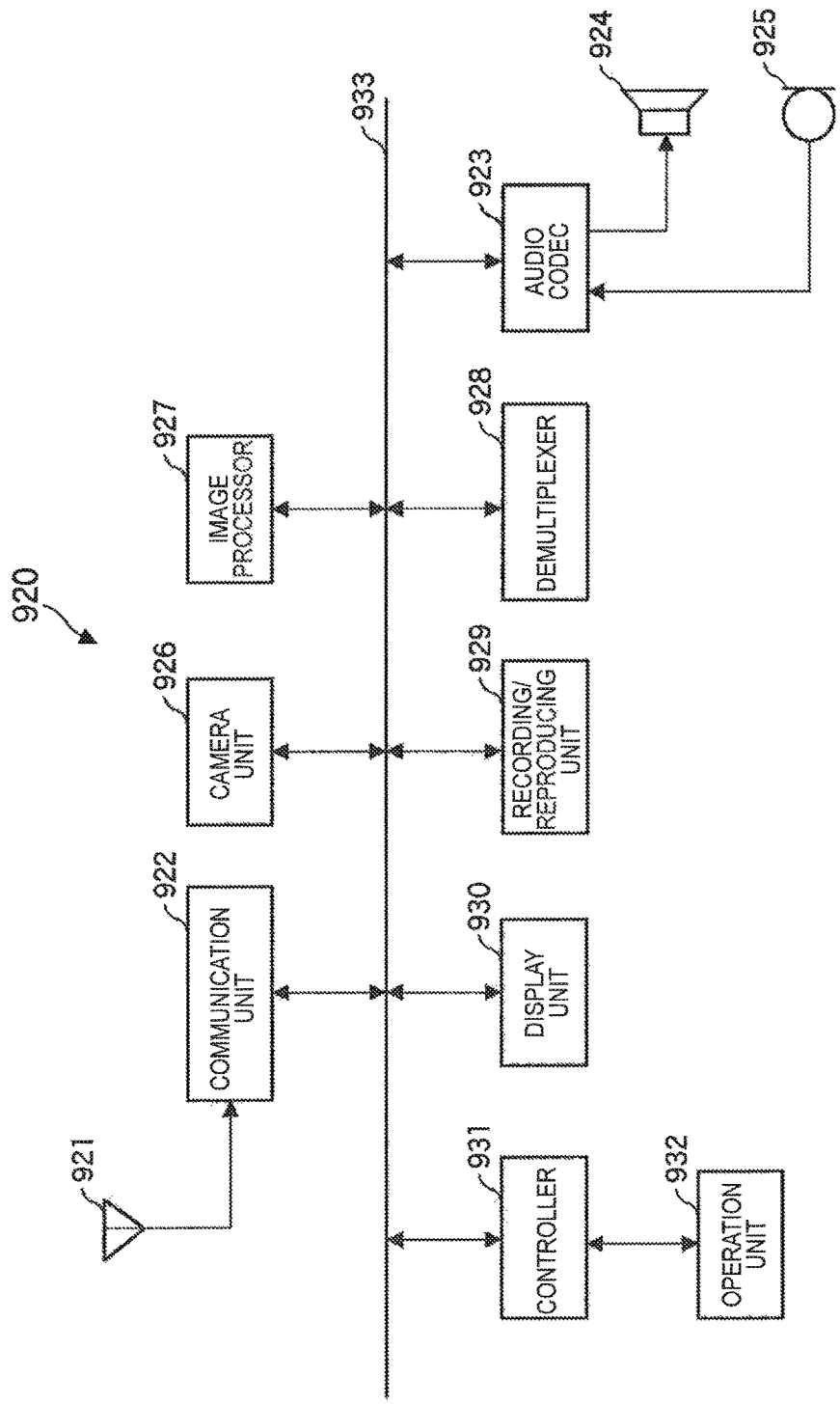
FIG. 24 is a block diagram illustrating an example of a schematic configuration of a portable telephone device.

FIG. 24 is an example of a schematic configuration of a portable telephone device to which the above-described embodiment is applied. The portable telephone device 920 includes an antenna 921, a communication unit 922, an audio codec 923, a speaker 924, a microphone 925, a camera unit 926, an image processor 927, a demultiplexer 928, a recording/reproducing unit 929, a display unit 930, a controller 931, an operation unit 932, and a bus 933.

The antenna 921 is connected to the communication unit 922. The speaker 924 and the microphone 925 are connected to the audio codec 923. The operation unit 932 is connected to the controller 931. The bus 933 connects the communication unit 922, the audio codec 923, the camera unit 926, the image processor 927, the demultiplexer 928, the recording/reproducing unit 929, the display unit 930, and the controller 931 to one another.

The portable telephone device 920 performs operation such as transmission/reception of audio signals, transmission/reception of electronic mails and image data, capturing of images, recording of data, and the like in various operation modes including a voice call mode, a data communication mode, an imaging mode, and a video telephone mode.

In the voice call mode, an analog audio signal generated by the microphone 925 is supplied to the audio codec 923. The audio codec 923 converts the analog audio signal to audio data, performs A/D conversion on the converted audio data, and compresses the audio data. The audio codec 923 then outputs the audio data resulting from the compression to the communication unit 922. The communication unit 922 encodes and modulates the audio data to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The communication unit 922 then demodulates and decodes the received signal to generate audio data, and outputs the generated audio data to the audio codec 923. The audio codec 923 decompresses and performs D/A conversion on the audio data to generate an analog audio signal. The audio codec 923 then supplies the generated audio signal to the speaker 924 to output audio therefrom.

In the data communication mode, the controller 931 generates text data to be included in an electronic mail according to operation by a user via the operation unit 932, for example. The controller 931 also displays the text on the display unit 930. The controller 931 also generates electronic mail data in response to an instruction for transmission from a user via the operation unit 932, and outputs the generated electronic mail data to the communication unit 922. The communication unit 922 encodes and modulates the electronic mail data to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The communication unit 922 then demodulates and decodes the received signal to restore electronic mail data, and outputs the restored electronic mail data to the controller 931. The controller 931 displays the content of the electronic mail on the display unit 930 and stores the electronic mail data into a storage medium of the recording/reproducing unit 929.

The recording/reproducing unit 929 includes a readable/writable storage medium. For example, the storage medium may be an internal storage medium such as a RAM or flash memory, or may be an externally mounted storage medium such as a hard disk, a magnetic disk, a magneto-optical disk, a USB (unallocated space bitmap) memory, or a memory card.

In the imaging mode, the camera unit 926 images a subject to generate image data, and outputs the generated image data to the image processor 927, for example. The image processor 927 encodes the image data input from the camera unit 926, and stores an encoded stream in the storage medium of the storage/reproducing unit 929.

In the video telephone mode, the demultiplexer 928 multiplexes a video stream encoded by the image processor 927 and an audio stream input from the audio codec 923, and outputs the multiplexed stream to the communication unit 922, for example. The communication unit 922 encodes and modulates the stream to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The signal to be transmitted and the received signal may include encoded bit streams. The communication unit 922 then demodulates and decodes the received signal to restore the stream and outputs the restored stream to the demultiplexer 928. The demultiplexer 928 separates a video stream and an audio stream from the input stream, and outputs the video stream to the image processor 927 and the audio stream to the audio codec 923. The image processor 927 decodes the video stream to generate video data. The video data is supplied to the display unit 930, and a series of images is displayed by the display unit 930. The audio codec 923 decompresses and performs D/A conversion on the audio stream to generate an analog audio signal. The audio codec 923 then supplies the generated audio signal to the speaker 924 to output audio therefrom.

In the portable telephone device 920 having such a structure, the image processor 927 has the functions of the image encoding devices and the image decoding devices according to the embodiments described above. Accordingly, in encoding and decoding an image in the portable telephone device 920, the image quality degradation due to a rounding error is suppressed, so that the arithmetic operation accuracy can be improved, and the encoding efficiency can be improved.

6. Sixth Embodiment

[Third Application: Recording/Reproducing Device]

Figure 25:
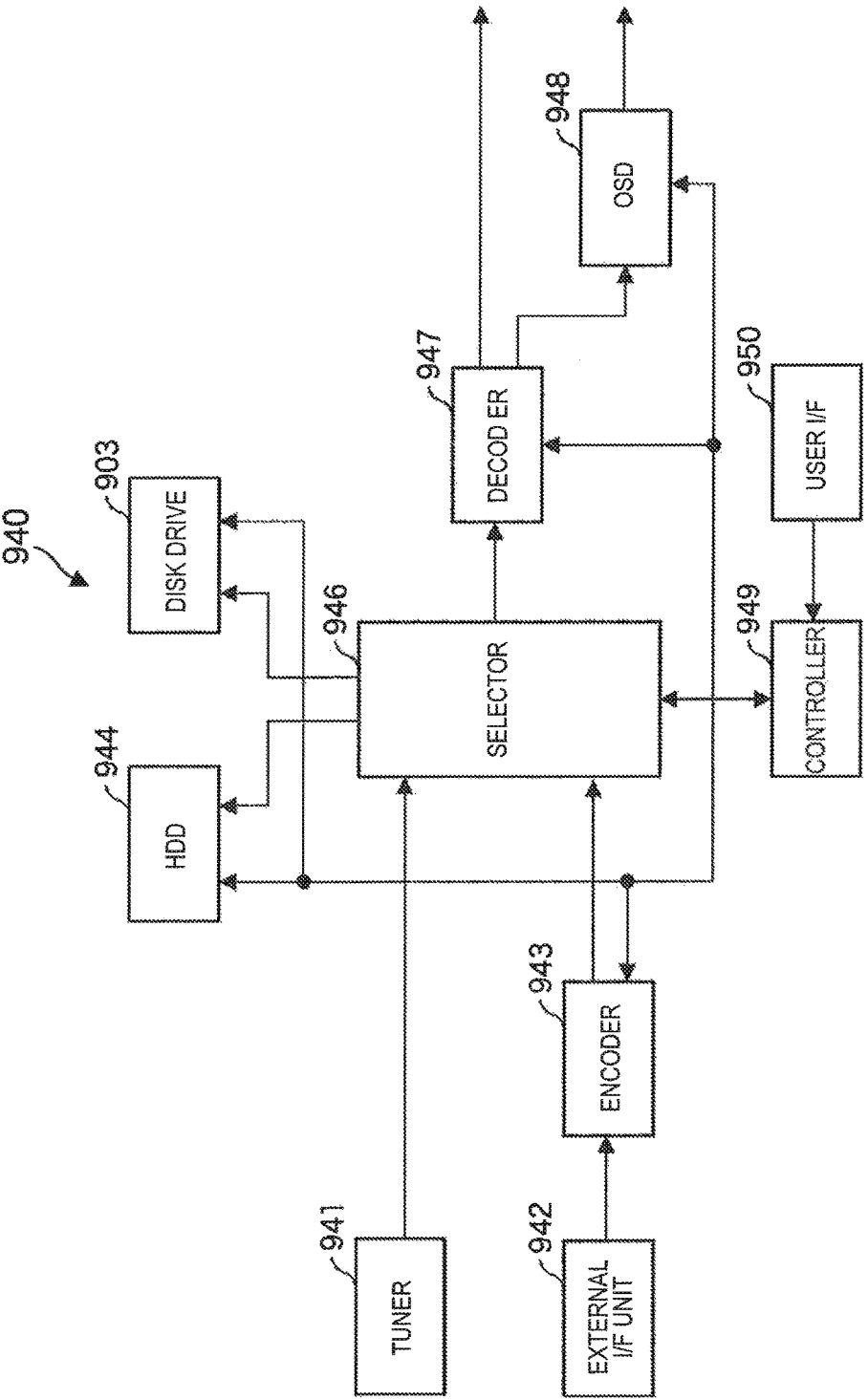
FIG. 25 is a block diagram illustrating an example of a schematic configuration of a recording/reproducing device.

FIG. 25 is an example of a schematic configuration of a recording/reproducing device to which the above-described embodiment is applied. The recording/reproducing device 940 encodes audio data and video data of a received broadcast program and records the encoded data into a recording medium, for example. The recording/reproducing device 940 may also encode audio data and video data acquired from another device and record the encoded data into a recording medium, for example. The recording/reproducing device 940 also reproduces data recorded in the recording medium on a monitor and through a speaker in response to an instruction from a user, for example. In this case, the recording/reproducing device 940 decodes audio data and video data.

The recording/reproducing device 940 includes a tuner 941, an external interface 942, an encoder 943, an HDD (hard disk drive) 944, a disk drive 945, a selector 946, a decoder 947, an OSD (on-screen display) 948, a controller 949, and a user interface 950.

The tuner 941 extracts a signal of a desired channel from broadcast signals received via an antenna (not shown), and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface for connecting the recording/reproducing device 940 with an external device or a network. The external interface 942 may be an IEEE 1394 interface, a network interface, a USB interface, or a flash memory interface, for example. For example, video data and audio data received via the external interface 942 are input to the encoder 943. That is, the external interface 942 has a role as transmission means in the recording/reproducing device 940.

The encoder 943 encodes the video data and the audio data if the video data and the audio data input from the external interface 942 are not encoded. The encoder 943 then outputs the encoded bit stream to the selector 946.

The HDD 944 stores an encoded bit stream in which content data such as video and audio is compressed, various programs, and other data in an internal hard disk. The HDD 944 also reads out the data from the hard disk for reproduction of video and audio.

The disk drive 945 records and reads out data into/from a recording medium mounted thereon. The recording medium mounted on the disk drive 945 may be a DVD disk (such as a DVD-Video, a DVD-RAM, a DVD-R, a DVD-RW, a DVD+R, or a DVD+RW) or a Blu-ray (registered trademark) disc, for example.

For recording video and audio, the selector 946 selects an encoded bit stream input from the tuner 941 or the encoder 943 and outputs the selected encoded bit stream to the HDD 944 or the disk drive 945. For reproducing video and audio, the selector 946 selects an encoded bit stream input from the HDD 944 or the disk drive 945 to the decoder 947.

The decoder 947 decodes the encoded bit stream to generate video data and audio data. The decoder 947 then outputs the generated video data to the OSD 948. The decoder 904 also outputs the generated audio data to an external speaker.

The OSD 948 reproduces the video data input from the decoder 947 and displays the video. The OSD 948 may also superimpose a GUI image such as a menu, a button or a cursor on the video to be displayed.

The controller 949 includes a processor such as a CPU, and a memory such as a RAM and a ROM. The memory stores programs to be executed by the CPU, program data, and the like. Programs stored in the memory are read and executed by the CPU when the recording/reproducing device 940 is activated, for example. The CPU controls the operation of the recording/reproducing device 940 according to control signals input from the user interface 950, for example, by executing the programs.

The user interface 950 is connected to the controller 949. The user interface 950 includes buttons and switches for users to operate the recording/reproducing device 940 and a receiving unit for receiving remote control signals, for example. The user interface 950 detects operation by a user via these components, generates a control signal, and outputs the generated control signal to the controller 949.

In the recording/reproducing device 940 having such a structure, the encoder 943 has the functions of the image encoding devices according to the embodiments described above. Furthermore, the decoder 947 has the functions of the image decoding devices according to the embodiments described above. Accordingly, in encoding and decoding an image in the recording/reproducing device 940, the image quality degradation due to a rounding error is suppressed, so that the arithmetic operation accuracy can be improved, and the encoding efficiency can be improved.

7. Seventh Embodiment

[Fourth Application: Imaging Device]

Figure 26:
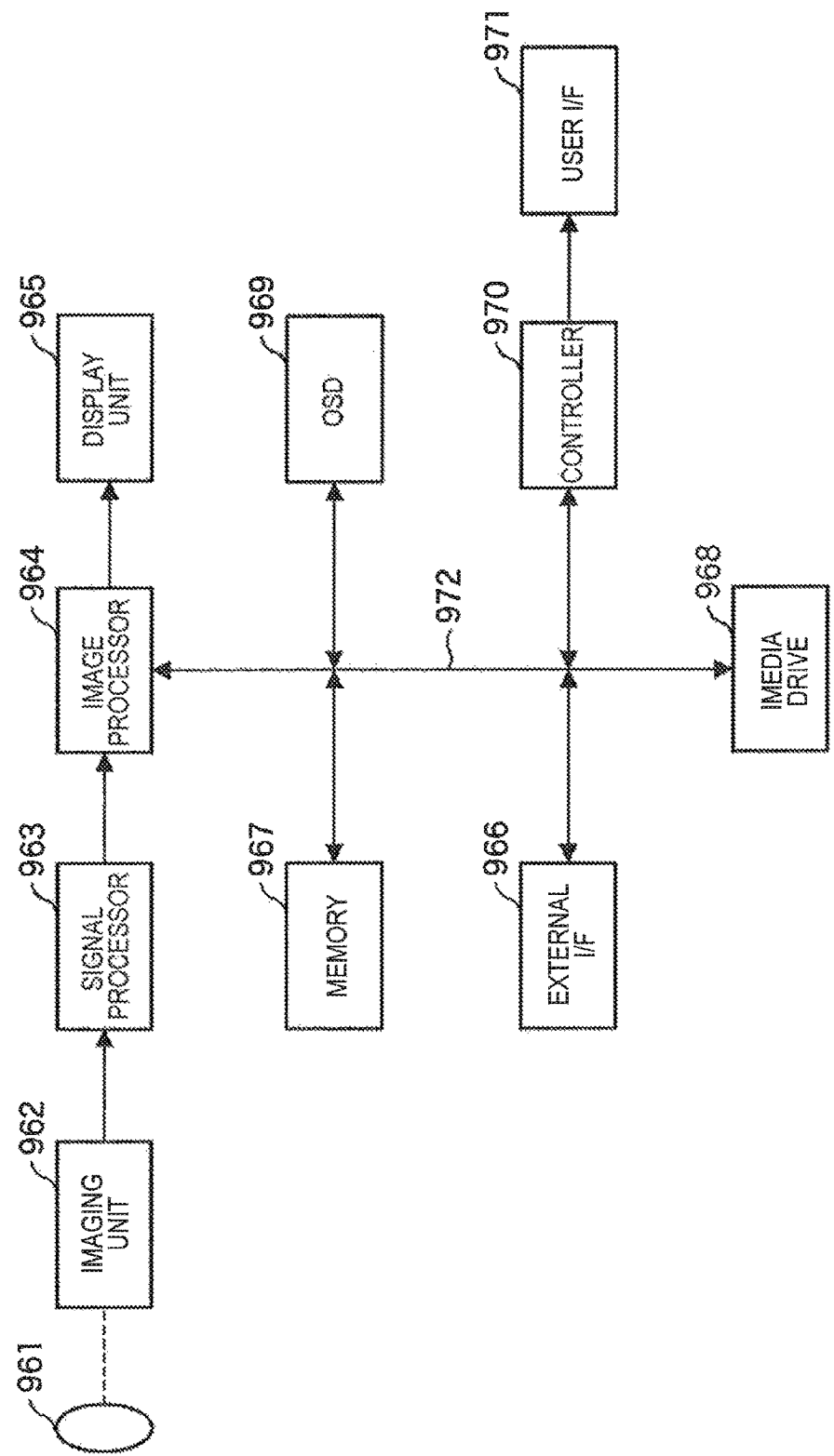
FIG. 26 is a block diagram illustrating an example of a schematic configuration of an imaging device.

FIG. 26 illustrates an example of a schematic configuration of an imaging device in which the above-described embodiment is applied. The imaging device 960 images a subject to generate an image, encodes the image data, and records the encoded image data in a recording medium.

The imaging device 960 includes an optical block 961, an imaging unit 962, a signal processor 963, an image processor 964, a display unit 965, an external interface 966, a memory 967, a media drive 968, an OSD 969, a controller 970, a user interface 971, and a bus 972.

The optical block 961 is connected to the imaging unit 962. The imaging unit 962 is connected to the signal processor 963. The display unit 965 is connected to the image processor 964. The user interface 971 is connected to the controller 970. The bus 972 connects the image processor 964, the external interface 966, the memory 967, the media drive 968, the OSD 969, and the controller 970 to one another.

The optical block 961 includes a focus lens, a diaphragm, and the like. The optical block 961 forms an optical image of a subject on the imaging surface of the imaging unit 962. The imaging unit 962 includes an image sensor such as a CCD (charge coupled device) or a CMOS (complementary metal oxide semiconductor), and converts the optical image formed on the imaging surface into an image signal that is an electric signal through photoelectric conversion. The imaging unit 962 then outputs the image signal to the signal processor 963.

The signal processor 963 performs various kinds of camera signal processing such as knee correction, gamma correction, and color correction on the image signal input from the imaging unit 962. The signal processor 963 outputs image data subjected to the camera signal processing to the image processor 964.

The image processor 964 encodes the image data input from the signal processor 963 to generate encoded data. The image processor 964 then outputs the generated encoded data to the external interface 966 or the media drive 968. The image processor 964 also decodes encoded data input from the external interface 966 or the media drive 968 to generate image data. The image processor 964 then outputs the generated image data to the display unit 965. The image processor 964 may output image data input from the signal processor 963 to the display unit 965 to display images. The image processor 964 may also superimpose data for display acquired from the OSD 969 on the images to be output to the display unit 965.

The OSD 969 may generate a GUI image such as a menu, a button or a cursor and output the generated image to the image processor 964, for example.

The external interface 966 is a USB input/output terminal, for example. The external interface 966 connects the imaging device 960 and a printer for printing of an image, for example. In addition, a drive is connected to the external interface 966 as necessary. A removable medium such as a magnetic disk or an optical disk is mounted to the drive, for example, and a program read out from the removable medium can be installed in the imaging device 960. Furthermore, the external interface 966 may be a network interface connected to a network such as a LAN or the Internet. That is, the external interface 966 has a role as transmission means in the imaging device 960.

The recording medium to be mounted on the media drive 968 may be a readable/writable removable medium such as a magnetic disk, a magneto-optical disk, an optical disk or a semiconductor memory. Alternatively, a recording medium may be mounted on the media drive 968 in a fixed manner to form an immobile storage unit such as an internal hard disk drive or an SSD (solid state drive), for example.

The controller 970 includes a processor such as a CPU, and a memory such as a RAM and a ROM. The memory stores programs to be executed by the CPU, program data, and the like. Programs stored in the memory are read and executed by the CPU when the imaging device 960 is activated, for example. The CPU controls the operation of the imaging device 960 according to control signals input from the user interface 971, for example, by executing the programs.

The user interface 971 is connected with the controller 970. The user interface 971 includes buttons and switches for users to operate the imaging device 960, for example. The user interface 971 detects operation by a user via these components, generates a control signal, and outputs the generated control signal to the controller 970.

In the imaging device 960 having such a structure, the image processor 964 has the functions of the image encoding devices and the image decoding devices according to the embodiments described above. Accordingly, in encoding and decoding an image in the imaging device 960, the image quality degradation due to a rounding error is suppressed, so that the arithmetic operation accuracy can be improved, and the encoding efficiency can be improved.

Note that, in the present specification, an example has been described, in which various pieces of information such as difference motion information and a weight coefficient are multiplexed in the header of the encoded stream, and transmitted from the encoding side to the decoding side. The method in which the information pieces are transmitted, however, is not limited to these examples. For example, the information pieces may be transmitted or recorded as separate data associated with the encoded bit stream without being multiplexed with the encoded bit stream. Note that the term "associate" means to allow images (which may be part of images such as slices or blocks) contained in a bit stream to be linked with information on the images in decoding. That is, the information may be transmitted via a transmission path different from that for the images (or bit stream). Alternatively, the information may be recorded in a recording medium other than that for the images (or bit stream) (or on a different area of the same recording medium). Furthermore, the information and the images (orbit stream) may be associated with each other in any units such as in units of some frames, one frame or part of a frame.

As described above, favorable embodiments of the present disclosure have been described, with reference to the appended drawings. However, the present invention is not limited to these examples. It is apparent that a person ordinary skilled in the art to which the present disclosure belongs can conceive various variations and modifications within the technical idea described in the claims, and it is naturally appreciated that these variations and modification belongs within the technical scope of the present disclosure.

The present technique can also have the following structures.

(1) An image processing device including:
  a motion compensation unit configured to perform motion compensation of sub-pixel accuracy of for each of L0 and L1;
  a weighted addition unit configured to apply weighted addition to arithmetic operation results by the motion compensation unit; and
  a rounding processing unit configured to apply a rounding process to an arithmetic operation result by the weighted addition unit.
(2) The image processing device according to (1), further including:
  a determination unit configured to determine accuracy of L0 and L1; and
  an adjustment unit configured adjust the accuracy based on a determination result of the determination unit.
(3) The image processing device according to (2), wherein the adjustment unit adjusts one accuracy to the other accuracy by multiplying a predetermined coefficient to one of L0 and L1.
(4) The image processing device according to (3), wherein the adjustment unit adjusts higher accuracy to lower accuracy between L0 and L1.
(5) The image processing device according to (3) or (4), wherein the adjustment unit does not perform the adjustment of the accuracy when the accuracy of L0 and the accuracy of L1 are equal to each other.
(6) The image processing device according to (3) to (5), wherein the adjustment unit adjusts the accuracy based on the accuracy of L0 and the accuracy of L1 both in a horizontal direction and in a vertical direction.
(7) The image processing device according to any one of (1) to (6), wherein the rounding processing unit performs a division process of 2X+Y after the arithmetic operation process of the weighted addition unit where a multiplication process for motion vector accuracy adjustment is 2X, and a division process for a weighted prediction process is 2Y.
(8) The image processing device according to (1) to (7), wherein the weighted addition unit performs Explicit Weighted Prediction.
(9) The image processing device according to (1) to (8), wherein the weighted addition unit performs Implicit Weighted Prediction.
(10) The image processing device according to (1) to (9), wherein the weighted addition unit performs Intensity Compensation.
(11) An image processing method of an image processing device including:
  performing, by a motion compensation unit, motion compensation of sub-pixel accuracy for each of L0 and L1;
  applying, by a weighted addition unit, weighted addition to arithmetic operation results; and
  applying, by a rounding processing unit, a rounding process to an arithmetic operation result.

REFERENCE SIGNS LIST

100 Image encoding device
115 Motion prediction/compensation unit
121 Weighted prediction unit
122 Motion vector accuracy determination unit
151 Motion search unit
154 Motion compensation unit
161 Weight coefficient determination unit
162 Motion accuracy adjustment unit
200 Image decoding device
212 Motion prediction/compensation unit
221 Weighted prediction unit
222 Motion vector accuracy determination unit
251 Weight coefficient buffer
252 Difference motion information buffer
253 Motion information reconstruction unit
254 Motion information buffer
255 Motion compensation unit
261 Weight coefficient determination unit
262 Motion accuracy adjustment unit

The invention claimed is:

1. An image processing device comprising:
  at least one central processing unit (CPU) configured to
    perform motion compensation of integer pixel or sub-pixel accuracy for each of reference frames L0 and L1;
    apply weighted addition to arithmetic operation results of the motion compensation, wherein the arithmetic operation results are respectively adjusted by multiplying each arithmetic operation result having lower accuracy by an adjustment amount that is determined based on each respective combination of horizontal accuracy and vertical accuracy between the reference frames L0 and L1, including each of the integer pixel or sub-pixel accuracy for horizontal components between each of the reference frames L0 and L1 and the integer pixel or sub-pixel accuracy for vertical components between each of the reference frames L0 and L1; and
    apply a rounding process to an arithmetic operation result of the weighted addition,
  wherein the adjustment amount is further determined based on a similarity of the accuracy of the horizontal and vertical components between the reference frames L0 and L1 in each respective combination, and
  wherein the adjustment amount is determined according to a table indicating a respective adjustment value for each respective combination of the horizontal and vertical components between the reference frames L0 and L1.

2. The image processing device according to claim 1, wherein the at least one CPU is further configured to adjust higher motion vector accuracy to lower motion vector accuracy between the reference frames L0 and L1.

3. The image processing device according to claim 1, wherein the at least one CPU does not perform the adjustment of the accuracy when the integer pixel or sub-pixel accuracy of L0 and the integer pixel or sub-pixel accuracy of L1 are equal to each other.

4. The image processing device according to claim 1, wherein the at least one CPU, in applying a rounding process, is further configured to perform a division process after the arithmetic operation process of the weighted addition including a multiplication process for motion vector accuracy adjustment and a division process for a weighted prediction process.

5. The image processing device according to claim 1, wherein the weighted addition is performed by Explicit Weighted Prediction.

6. The image processing device according to claim 1, wherein the weighted addition is performed by Implicit Weighted Prediction.

7. The image processing device according to claim 1, wherein the weighted addition is performed by Intensity Compensation.

8. A non-transitory computer-readable storage medium having embodied thereon a program, which when executed by a computer causes the computer to execute an image processing method, the method comprising:

performing motion compensation of integer pixel or sub-pixel accuracy for each of reference frames L0 and L1;

applying weighted addition to arithmetic operation results of the motion compensation, wherein the arithmetic operation results are respectively adjusted by multiplying each arithmetic operation result having lower accuracy by an adjustment amount that is determined based on each respective combination of horizontal accuracy and vertical accuracy between the reference frames L0 and L1, including each of the integer pixel or sub-pixel accuracy for horizontal components between each of the reference frames L0 and L1 and the integer pixel or sub-pixel accuracy for vertical components between each of the reference frames L0 and L1; and applying a rounding process to an arithmetic operation result of the weighted addition, wherein the adjustment amount is further determined based on a similarity of the accuracy of the horizontal and vertical components between the reference frames L0 and L1 in each respective combination, and wherein the adjustment amount is determined according to a table indicating a respective adjustment value for each respective combination of the horizontal and vertical components between the reference frames L0 and L1.

9. An image processing method, implemented via at least one processor, the method comprising:

performing motion compensation of integer pixel or sub-pixel accuracy for each of reference frames L0 and L1;

applying weighted addition to arithmetic operation results of the motion compensation, wherein the arithmetic operation results are respectively adjusted by multiplying each arithmetic operation result having lower accuracy by an adjustment amount that is determined based on each respective combination of horizontal accuracy and vertical accuracy between the reference frames L0 and L1, including each of the integer pixel or sub-pixel accuracy for horizontal components between each of the reference frames L0 and L1 and the integer pixel or sub-pixel accuracy for vertical components between each of the reference frames L0 and L1; and applying a rounding process to an arithmetic operation result of the weighted addition, wherein the adjustment amount is further determined based on a similarity of the accuracy of the horizontal and vertical components between the reference frames L0 and L1 in each respective combination, and wherein the adjustment amount is determined according to a table indicating a respective adjustment value for each respective combination of the horizontal and vertical components between the reference frames L0 and L1.

10. The image processing device according to claim 1, wherein the arithmetic operation results are not adjusted when the respective combination has the same accuracy of the horizontal and vertical components for both of the reference frames L0 and L1.

11. The non-transitory computer-readable storage medium according to claim 8, wherein the arithmetic operation results are not adjusted when the respective combination has the same accuracy of the horizontal and vertical components for both of the reference frames L0 and L1.

12. The image processing method according to claim 9, wherein the arithmetic operation results are not adjusted when the respective combination has the same accuracy of the horizontal and vertical components for both of the reference frames L0 and L1.

* * * * *